US012621830B2

(12) United States Patent
Ma et al.

(10) Patent No.: US 12,621,830 B2
(45) Date of Patent: May 5, 2026

(54) METHOD FOR PHYSICAL DOWNLINK CONTROL CHANNEL MONITORING AND RELATED DEVICES AND SYSTEMS

(71) Applicant: ZTE CORPORATION, Guangdong (CN)

(72) Inventors: Xiaoying Ma, Shenzhen (CN); Mengzhu Chen, Shenzhen (CN); Qiujin Guo, Shenzhen (CN); Jun Xu, Shenzhen (CN); Jian Kang, Shenzhen (CN); Qiang Fu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 424 days.

(21) Appl. No.: 17/816,219

(22) Filed: Jul. 29, 2022

(65) Prior Publication Data

US 2023/0024010 A1     Jan. 26, 2023

Related U.S. Application Data

(63) Continuation of application No. PCT/CN2020/121578, filed on Oct. 16, 2020.

(51) Int. Cl.
*H04W 72/1273* (2023.01)
*H04W 24/08* (2009.01)
*H04W 72/23* (2023.01)

(52) U.S. Cl.
CPC ....... *H04W 72/1273* (2013.01); *H04W 24/08* (2013.01); *H04W 72/23* (2023.01)

(58) Field of Classification Search
CPC .... H04L 5/0056; H04L 5/0094; H04W 24/08; H04W 52/0216; H04W 52/0219;
(Continued)

(56) References Cited

U.S. PATENT DOCUMENTS 10,608,779 B2 *   3/2020   Sun ......................... H04L 1/001
10,820,269 B2 *  10/2020   Lu .......................... H04L 5/0044
(Continued)

FOREIGN PATENT DOCUMENTS

WO     WO-2020/197220 A1     10/2020
WO     WO-2020/204464 A1     10/2020
(Continued)

OTHER PUBLICATIONS

International Search Report and Written Opinion for PCT Appl. No. PCT/CN2020/121578, mailed Jul. 7, 2021 (8 pages).
(Continued)

*Primary Examiner* — Stephen J Clawson
(74) *Attorney, Agent, or Firm* — Foley & Lardner LLP

(57)     ABSTRACT

A wireless communication method for use in a wireless terminal is disclosed. The method comprises receiving, from a wireless network node, predefined control information associated with at least one first kind of search space set in a plurality of search space sets for a scheduled cell, determining at least one physical downlink control channel, PDCCH, candidate corresponding to at least one of the plurality of search space sets based on the predefined control information for the scheduled cell, and monitoring the at least one PDCCH candidate in a scheduling cell, wherein the plurality of search space sets comprises at least one second kind of search space set.

14 Claims, 4 Drawing Sheets

Receive, from a wireless network node, predefined control information associated with at least one first kind of search space set in a plurality of search space sets for a scheduled cell — 401

Determine at least one PDCCH candidate corresponding to at least one of the plurality of search space sets based on the predefined control information for the scheduled cell — 402

Monitor the at least one PDCCH candidate in a scheduling cell — 403

(58) Field of Classification Search
CPC ........... H04W 52/0229; H04W 52/028; H04W 72/1273; H04W 72/23; H04W 72/231; H04W 72/232; H04W 76/28
See application file for complete search history.

(56) References Cited

U.S. PATENT DOCUMENTS

| | | | | |
|---|---|---|---|---|
| 2014/0022963 A1* | 1/2014 | Yang | .................... | H04W 72/23 |
| | | | | 370/280 |
| 2015/0319718 A1* | 11/2015 | Yang | .................... | H04W 76/15 |
| | | | | 370/252 |
| 2016/0330011 A1* | 11/2016 | Lee | ........................... | H04L 5/14 |
| 2020/0229092 A1* | 7/2020 | Wu | ........................ | H04W 76/28 |
| 2020/0314811 A1* | 10/2020 | Lin | ................... | H04W 52/0216 |

| | | | | |
|---|---|---|---|---|
| 2022/0174651 A1 | 6/2022 | Seo et al. | | |
| 2023/0054007 A1* | 2/2023 | Kim | ...................... | H04L 5/0053 |
| 2024/0292431 A1* | 8/2024 | Matsumura | ....... | H04W 72/1268 |

FOREIGN PATENT DOCUMENTS

| | | |
|---|---|---|
| WO | WO-2020/204484 A1 | 10/2020 |
| WO | WO-2020/209953 A1 | 10/2020 |

OTHER PUBLICATIONS

Extended European Search Report on EP Appl. No. 20957239.5, dated Sep. 13, 2023 (11 pages).
Qualcomm Incorporated, "UE Adaptation to the Traffic and UE Power Consumption Characteristics", 3GPP TSG-RAN WG1 Ad-Hoc Meeting 1901, R1-1900911, Taipei, Taiwan, Jan. 25, 2019 (24 pages).

* cited by examiner

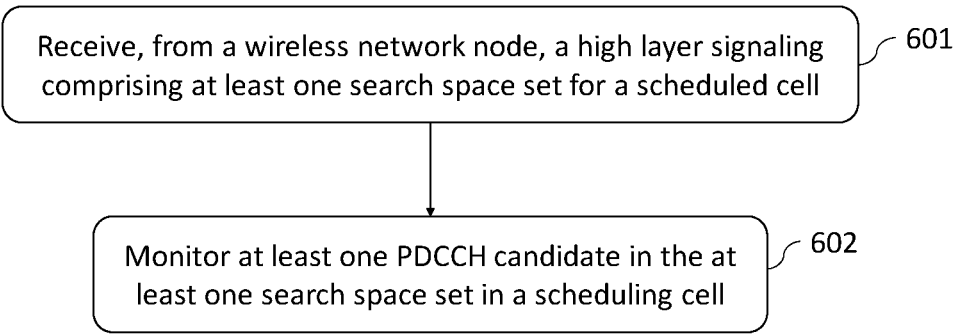

Receive, from a wireless network node, a high layer signaling comprising at least one search space set for a scheduled cell — 601

Monitor at least one PDCCH candidate in the at least one search space set in a scheduling cell — 602

FIG. 6

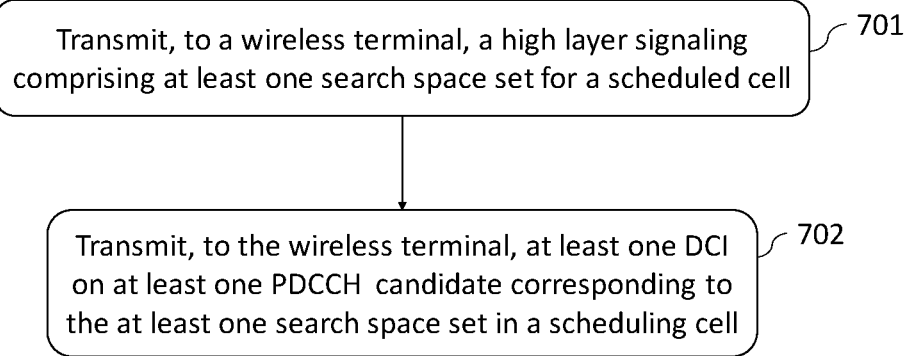

Transmit, to a wireless terminal, a high layer signaling comprising at least one search space set for a scheduled cell — 701

Transmit, to the wireless terminal, at least one DCI on at least one PDCCH candidate corresponding to the at least one search space set in a scheduling cell — 702

FIG. 7

METHOD FOR PHYSICAL DOWNLINK CONTROL CHANNEL MONITORING AND RELATED DEVICES AND SYSTEMS

CROSS-REFERENCE TO RELATED APPLICATION

This application claims the benefit of priority under 35 U.S.C. § 120 as a continuation of PCT Patent Application No. PCT/CN2020/121578, filed on Oct. 16, 2020, the disclosure of which is incorporated herein by reference in its entirety.

TECHNICAL FIELD

This document is directed generally to wireless communications.

SUMMARY

With the development of wireless communication technology, the transmission rate, delay, throughput, reliability and other performance indexes of a wireless communication system have been greatly improved by using high frequency band, large bandwidth, multi-antenna and other technologies.

On the other hand, in order to achieve high-performance wireless transmissions, terminals need to carry out more complex processing to meet performance requirements, such as monitoring larger control channel bandwidth, encoding and decoding processing for more complex control information and data information, etc. The more complex processing means greater power consumption at terminal side and may affect user experience. Therefore, the power saving of a terminal is a problem that wireless communication system needs to solve.

This document relates to systems and methods to solve problems of current power saving technologies for terminals in wireless communication systems.

The present disclosure relates to a wireless communication method for use in a wireless terminal. The method comprises:

receiving, from a wireless network node, predefined control information associated with at least one first kind of search space set in a plurality of search space sets for a scheduled cell, determining at least one physical downlink control channel, PDCCH, candidate corresponding to at least one of the plurality of search space sets based on the predefined control information for the scheduled cell, and monitoring the at least one PDCCH candidate in a scheduling cell, wherein the plurality of search space sets comprises at least one second kind of search space set.

Various embodiments may preferably implement the following features:

Preferably, the wireless terminal does not monitor the PDCCH candidate in the at least one first kind of search space set in the scheduling cell based on the predefined control information.

Preferably, the wireless terminal monitors the PDCCH candidate in the at least one second kind of search space set in the scheduling cell based on the predefined control information.

Preferably, the at least one first kind of search space set and the at least one second kind search space set are in an active bandwidth part.

Preferably, the predefined control information comprises at least one of a PDCCH skipping indication, a search space set group switch indication, downlink control information, a PDCCH reduction indication, a search space set, a frequency range type, a sub-carrier spacing, the minimum applicable value of a scheduling offset between DCI and an uplink channel scheduled by the DCI, a value of the scheduling offset between DCI and a uplink channel scheduled by the DCI, the minimum applicable value of a scheduling offset between DCI and a downlink channel scheduled by the DCI, a value of a scheduling offset between DCI and a downlink channel scheduled by the DCI, a discontinuous reception inactivity timer, a discontinuous reception on duration timer, a discontinuous reception state, a discontinuous reception configuration, a control resource set, a bandwidth part, a radio network temporary identifier, a higher layer signaling, or a serving cell configuration.

Preferably, the determining the at least one PDCCH candidate corresponding to at least one of the plurality of search space sets based on the predefined control information for the scheduled cell comprises:

counting the number of at least one PDCCH candidate corresponding to each of the plurality of search space sets and/or the number of non-overlapped control channel elements, CCEs, of the at least one PDCCH candidate corresponding to each of the plurality of search space sets based on the predefined control information, for determining the at least one PDCCH candidate to be monitored.

Preferably, the counting the number of at least one PDCCH candidate corresponding to each of the plurality of search space sets and/or non-overlapped CCEs of at least one PDCCH candidate corresponding to each of the plurality of search space sets based on the predefined control information comprises:

a first PDCCH candidate in a first search space set with a first index is ignored when counting the number of the at least one PDCCH candidate when:

a second PDCCH candidate in a second search space set having a second index uses the same set of CCEs as the first PDCCH candidate, wherein the first index is greater than the second index, the second PDCCH candidate in the second search space set has the same scrambling as the first PDCCH candidate, and DCI format corresponding to the second PDCCH candidate in the second search space set has the same size as DCI format corresponding to the first PDCCH candidate, wherein the first search space set and the second search space set are second kind of search space sets.

Preferably, the counting the number of the at least one PDCCH candidate corresponding to each of the plurality of search space sets or the non-overlapped CCEs of the at least one PDCCH candidate corresponding to each of the plurality of search space sets based on the predefined control information for the scheduled cell comprises:

counting the number of the at least one PDCCH candidate or the non-overlapped control channel elements of the at least one PDCCH candidate corresponding to the plurality of search space sets except the at least one first kind of search space set for the serving cell, excluding the at least one first kind of search space set when counting the number of the at least one PDCCH candidate and/or the number of the non-overlapped CCEs of the at least one PDCCH candidate corresponding to each of the plurality of search space sets for the serving cell, setting the number of at least one PDCCH candidate corresponding to each of the at least one first kind of search space set and/or the number of non-overlapped control channel elements of the at least one PDCCH candidate corresponding to each of the at least one first kind of search space set as a predefined value, where the predefined value is greater than or equal to 0.

Preferably, wherein the determining the at least one PDCCH candidate corresponding to at least one of the plurality of search space sets based on the predefined control information for the scheduled cell comprises allocating the at least one PDCCH candidate in at least one of the plurality of search space sets to be monitored in the scheduling cell based on the predefined control information.

Preferably, the counting the number of the at least one PDCCH candidate corresponding to each of the plurality of search space sets or the non-overlapped CCEs of the at least one PDCCH candidate corresponding to each of the plurality of search space sets based on the predefined control information for the scheduled cell comprises:

counting the number of the at least one PDCCH candidate or the non-overlapped control channel elements of the at least one PDCCH candidate corresponding to the plurality of search space sets except the at least one first kind of search space set for the serving cell, excluding the at least one first kind of search space set when counting the number of the at least one PDCCH candidate and/or the number of the non-overlapped CCEs of the at least one PDCCH candidate corresponding to each of the plurality of search space sets for the serving cell, setting the number of at least one PDCCH candidate corresponding to each of the at least one first kind of search space set and/or the number of non-overlapped control channel elements of the at least one PDCCH candidate corresponding to each of the at least one first kind of search space set as a predefined value, where the predefined value is greater than or equal to 0.

Preferably, the determining the at least one PDCCH candidate corresponding to at least one of the plurality of search space sets based on the predefined control information for the scheduled cell comprises allocating the at least one PDCCH candidate in at least one of the plurality of search space sets to be monitored in the scheduling cell based on the predefined control information.

Preferably, the allocating the at least one PDCCH candidate in at least one of the plurality of search space sets to be monitored in the scheduling cell based on the predefined control information comprises:

allocating the at least one PDCCH candidate in the plurality of search space sets except the at least one first kind of search space set to be monitored in the scheduling cell, or not allocating the at least one PDCCH candidate in the at least one first kind of search space set to be monitored in the scheduling cell.

Preferably, the allocating the at least one PDCCH candidate in the plurality of search space sets except the at least one first kind of search space set to be monitored in the scheduling cell, or not allocating the at least one PDCCH candidate in the at least one first kind of search space set to be monitored in the scheduling cell comprises at least one of:

allocating at least one PDCCH candidate in each of common search space, CSS, sets in the plurality of search space sets to be monitored in the scheduling cell, allocating at least one PDCCH candidate in at least one CSS set of the plurality of search space sets except the at least one first kind of search space set to be monitored in the scheduling cell, or allocating at least one PDCCH candidate in at least one user-specific search space, USS, set of the plurality of search space sets except the at least one first kind of search space set to be monitored in a sequence of an ascending order of at least one index of the at least one USS set.

Preferably, the determining the at least one PDCCH candidate corresponding to at least one of the plurality of search space sets based on the predefined control information for the scheduled cell comprises:

determining the at least one PDCCH candidate in at least one of the plurality of search space sets to be monitored based on a parameter, whose value is determined based on the predefined control information, wherein the parameter comprises at least one of the maximum number of monitored PDCCH candidates per time unit or the maximum number of non-overlapped control channel elements per time unit.

Preferably, the time unit is at least one slot or a span.

Preferably, the value of the parameter changes between a first value and a second value based on the predefined control information and the second value is greater than the first value.

The present disclosure relates to a wireless communication method for use in a wireless network node. The method comprises:

transmitting, to a wireless terminal, predefined control information associated with at least one first kind of search space set in a plurality of search space sets for a scheduled cell, determining at least one physical downlink control channel, PDCCH, candidate corresponding to at least one of the plurality of search space sets based on the predefined control information for the scheduled cell, and transmitting, to the wireless terminal, at least one DCI on the at least one PDCCH candidate in a scheduling cell, wherein the plurality of search space sets comprises at least one second kind of search space set.

Various embodiments may preferably implement the following features:

Preferably, the wireless network node does not transmit the at least one DCI in the at least one first kind of search space set in the scheduling cell.

Preferably, the wireless network node transmits the at least one DCI in the at least one second kind of search space set in the scheduling cell.

Preferably, wherein the at least one first kind of search space set and the at least one second kind search space set are in an active bandwidth part.

Preferably, the predefined control information comprises at least one of a PDCCH skipping indication, a search space set group switch indication, downlink control information, a PDCCH reduction indication, a search space set, a frequency range type, a sub-carrier spacing, the minimum applicable value of a scheduling offset between DCI and an uplink channel scheduled by the DCI, a value of the scheduling offset between DCI and a uplink channel scheduled by the DCI, the minimum applicable value of a scheduling offset between DCI and a downlink channel scheduled by the DCI, a value of a scheduling offset between DCI and a downlink channel scheduled by the DCI, a discontinuous reception inactivity timer, a discontinuous reception on duration timer, a discontinuous reception state, a discontinuous reception configuration, a control resource set, a bandwidth part, a radio network temporary identifier, a higher layer signaling, or a serving cell configuration.

Preferably, the determining the at least one PDCCH candidate corresponding to at least one of the plurality of search space sets based on the predefined control information for the scheduled cell comprises counting the number of at least one PDCCH candidate corresponding to each of the plurality of search space sets and/or the number of non-overlapped control channel elements, CCEs, of the at least one PDCCH candidate corresponding to each of the plurality of search space sets based on the predefined control information, for determining the at least one PDCCH candidate to be monitored.

Preferably, the counting the number of at least one PDCCH candidate corresponding to each of the plurality of search space sets and/or non-overlapped CCEs of at least one PDCCH candidate corresponding to each of the plurality of search space sets based on the predefined control information comprises:

a first PDCCH candidate in a first search space set with a first index is ignored when counting the number of the at least one PDCCH candidate when:

a second PDCCH candidate in a second search space set having a second index uses the same set of CCEs as the first PDCCH candidate, wherein the first index is greater than the second index, the second PDCCH candidate in the second search space set has the same scrambling as the first PDCCH candidate, and DCI format corresponding to the second PDCCH candidate in the second search space set has the same size as DCI format corresponding to the first PDCCH candidate, wherein the first search space set and the second search space set are second kind of search space sets.

Preferably, the counting the number of the at least one PDCCH candidate corresponding to each of the plurality of search space sets or the non-overlapped CCEs of the at least one PDCCH candidate corresponding to each of the plurality of search space sets based on the predefined control information for the scheduled cell comprises:

counting the number of the at least one PDCCH candidate or the non-overlapped control channel elements of the at least one PDCCH candidate corresponding to the plurality of search space sets except the at least one first kind of search space set for the serving cell, excluding the at least one first kind of search space set when counting the number of the at least one PDCCH candidate and/or the number of the non-overlapped CCEs of the at least one PDCCH candidate corresponding to each of the plurality of search space sets for the serving cell, setting the number of at least one PDCCH candidate corresponding to each of the at least one first kind of search space set and/or the number of non-overlapped control channel elements of the at least one PDCCH candidate corresponding to each of the at least one first kind of search space set as a predefined value, where the predefined value is greater than or equal to 0.

Preferably, the determining the at least one PDCCH candidate corresponding to at least one of the plurality of search space sets based on the predefined control information for the scheduled cell comprises allocating the at least one PDCCH candidate in at least one of the plurality of search space sets for transmitting the at least one reference signal in the scheduling cell based on the predefined control information.

Preferably, the allocating the at least one PDCCH candidate in at least one of the plurality of search space sets for transmitting the at least one reference signal in the scheduling cell based on the predefined control information comprises:

allocating the at least one PDCCH candidate in the plurality of search space sets except the at least one first kind of search space set for transmitting the at least one reference signal in the scheduling cell, or not allocating the at least one PDCCH candidate in the at least one first kind of search space set for transmitting the at least one reference signal in the scheduling cell.

Preferably, the allocating the at least one PDCCH candidate in the plurality of search space sets except the at least one first kind of search space set for transmitting the at least one reference signal in the scheduling cell, or not allocating the at least one PDCCH candidate in the at least one first kind of search space for transmitting the at least one reference signal in the scheduling cell comprises at least one of:

allocating at least one PDCCH candidate in each of common search space, CSS, set in the plurality of search space sets for transmitting the at least one reference signal in the scheduling cell, allocating at least one PDCCH candidate in at least one CSS set of the plurality of search space sets except the at least one first kind of search space set for transmitting the at least one reference signal in the scheduling cell, or allocating at least one PDCCH candidate in at least one user-specific search space, USS, set of the plurality of search space sets except the at least one first kind of search space set for transmitting the at least one reference signal in a sequence of an ascending order of at least one index of the at least one USS set.

Preferably, the determining the at least one PDCCH candidate corresponding to at least one of the plurality of search space sets based on the predefined control information for the scheduled cell comprises determining the at least one PDCCH candidate in at least one of the plurality of search space sets to be monitored based on a parameter, whose value is determined based on the predefined control information, wherein the parameter comprises at least one of the maximum number of monitored PDCCH candidates per time unit or the maximum number of non-overlapped control channel elements per time unit, Preferably, the time unit is at least one slot or a span.

Preferably, the value of the parameter changes between a first value and a second value based on the predefined control information, and the second value is greater than the first value.

The present disclosure relates to a wireless communication method for use in a wireless terminal. The method comprises:

receiving, from a wireless network node, a high layer signaling comprising at least one search space set for a scheduled cell, and monitoring at least one physical downlink control channel, PDCCH, candidate in the at least one search space set in a scheduling cell, wherein the number of the at least one PDCCH candidate in the at least one search space set configured by the high layer signaling is smaller than or equal to the maximum number of the monitored PDCCH candidates per time unit or the number of non-overlapped control channel elements of the at least one PDCCH candidate in the at least one search space set is smaller than or equal to the maximum number of control channel elements per time unit.

Various embodiments may preferably implement the following features:

Preferably, the time unit is at least one slot or a span.

Preferably, the at least one search space set comprises at least one second kind of common search space, CSS, set.

Preferably, the at least one search space set comprises at least one user specific search space, USS, set which has the same search space set group index.

The present disclosure relates to a wireless communication method for use in a wireless network node. The method comprises:

transmitting, to a wireless terminal, a high layer signaling comprising at least one search space set for a scheduled cell, transmitting, to the wireless terminal, at least one downlink control information on at least one physical downlink control channel, PDCCH, candidate corresponding to the at least one search space set in a scheduling cell, wherein the number of the at least one PDCCH candidate in the at least one search space set configured by the high layer signaling is smaller than or equal to the maximum number of the monitored PDCCH candidate per time unit or the number of non-overlapped control channel elements of the at least one PDCCH candidate in the at least one search space set is smaller than or equal to the maximum number of control channel elements per time unit.

Various embodiments may preferably implement the following features:

Preferably, the time unit is at least one slot or a span.

Preferably, the at least one search space set comprises at least one second kind of common search space, CSS, set.

Preferably, the at least one search space set comprises at least one user specific search space, USS, set which has the same search space set group index.

The present disclosure relates to a wireless terminal, comprising:

a communication unit, configured to receive, from a wireless network node, predefined control information associated with at least one first kind of search space set in a plurality of search space sets for a scheduled cell, and a processor, configured to:

determine at least one physical downlink control channel, PDCCH, candidate corresponding to at least one of the plurality of search space sets based on the predefined control information for the scheduled cell, and monitor the at least one PDCCH candidate in a scheduling cell, wherein the plurality of search space sets comprises at least one second kind of search space set.

Various embodiments may preferably implement the following feature:

Preferably, the processor is further configured to configured to perform a wireless communication method recited in any one of the foregoing described methods.

The present disclosure relates to a wireless network node comprising:

a communication unit, configured to transmit, to a wireless terminal, predefined control information associated with at least one first kind of search space set in a plurality of search space sets for a scheduled cell, and a processor, configured to determine at least one physical downlink control channel, PDCCH, candidate corresponding to at least one of the plurality of search space sets based on the predefined control information for the scheduled cell, and wherein the communication unit is further configured to transmit, to the wireless terminal, at least one DCI on the at least one PDCCH candidate in a scheduling cell, wherein the plurality of search space sets comprises at least one second kind of search space set.

Various embodiments may preferably implement the following feature:

Preferably, the processor is further configured to configured to perform a wireless communication method recited in any one of the foregoing described methods.

The present disclosure relates to a wireless terminal, comprising:

a communication unit, configured to receive, from a wireless network node, a high layer signaling comprising at least one search space set for a scheduled cell, and a processor, configured to monitor at least one physical downlink control channel, PDCCH, candidate in the at least one search space set in a scheduling cell, wherein the number of the at least one PDCCH candidate in the at least one search space set configured by the high layer signaling is smaller than or equal to the maximum number of the monitored PDCCH candidates per time unit or the number of non-overlapped control channel elements of the at least one PDCCH candidate in the at least one search space set is smaller than or equal to the maximum number of control channel elements per time unit.

Various embodiments may preferably implement the following feature:

Preferably, the processor is further configured to configured to perform a wireless communication method recited in any one of the foregoing described methods.

The present disclosure relates to a wireless network node comprising:

a communication unit, configured to transmit, to a wireless terminal, predefined control information associated with at least one first kind of search space set in a plurality of search space sets for a scheduled cell, and a processor, configured to determine at least one physical downlink control channel, PDCCH, candidate corresponding to at least one of the plurality of search space sets based on the predefined control information for the scheduled cell, and wherein the communication unit is further configured to transmit, to the wireless terminal, at least one DCI on the at least one PDCCH candidate in a scheduling cell, wherein the number of the at least one PDCCH candidate in the at least one search space set configured by the high layer signaling is smaller than or equal to the maximum number of the monitored PDCCH candidates per time unit or the number of non-overlapped control channel elements of the at least one PDCCH candidate in the at least one search space set is smaller than or equal to the maximum number of control channel elements per time unit.

Various embodiments may preferably implement the following feature:

Preferably, the wireless network node further comprises a processor configured to perform a wireless communication method recited in any one of the foregoing described methods.

The present disclosure relates to a computer program product comprising a computer-readable program medium code stored thereupon, the code, when executed by a processor, causing the processor to implement a method recited in any one of foregoing methods.

The exemplary embodiments disclosed herein are directed to providing features that will become readily apparent by reference to the following description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

BRIEF DESCRIPTION OF THE DRAWINGS

The above and other aspects and their implementations are described in greater detail in the drawings, the descriptions, and the claims.

FIG. 6 shows a flowchart of a method according to an embodiment of the present disclosure.

FIG. 7 shows a flowchart of a method according to an embodiment of the present disclosure.

DETAILED DESCRIPTION

Figure 1:
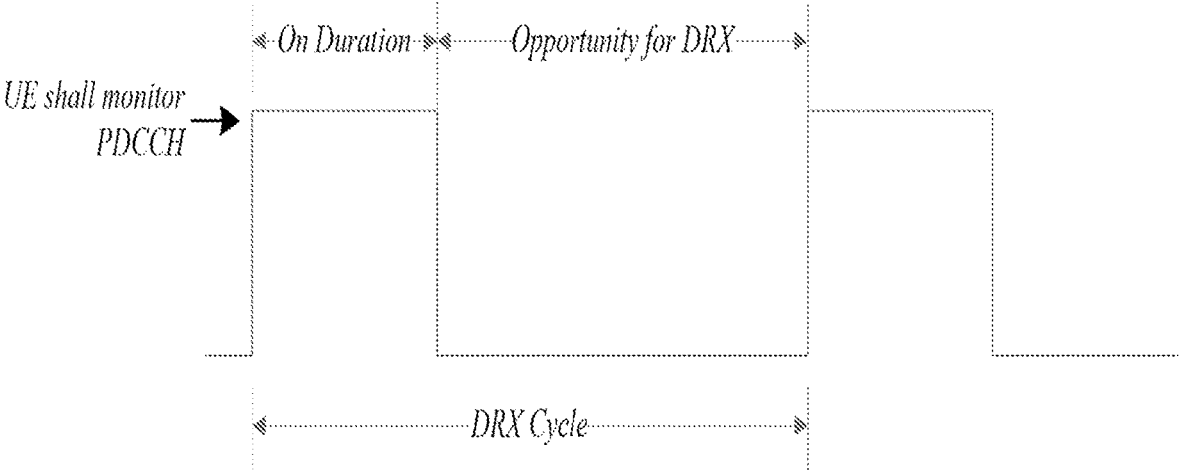
FIG. 1 shows an example for a DRX cycle according to an embodiment of the present disclosure.

In LTE (Long-Term Evolution), DRX (Discontinuous Reception) may be used for saving power of terminals (e.g. user equipments (UEs)).

The basic mechanism of DRX is illustrated as follows. A DRX cycle is configured for the UE and the DRX cycle begins when a timer (e.g. drx-ondurationTimer) starts. Before the timer drx-ondurationTimer expires (e.g. during the timer drx-ondurationTimer), the UE is in a "DRX On" state (or active time) and continues monitoring physical downlink control channel (PDCCH). If the UE successfully decodes a PDCCH in the "DRX On" state, the UE stays awake (i.e. in the "DRX On" state) and starts a timer drx-inactivity Timer (e.g. inactivity). The UE may go to sleep (e.g. being in a "DRX off" state) after drx-ondurationTimer and/or drx-inactivity Timer expires. In the "DRX off" state, the UE does not monitor some of PDCCH to save power.

Note that, the "DRX On" state includes (e.g. is) the time when the timer drx-onDurationTimer and/or drx-Inactivity-Timer is running (e.g. the time after the timer drx-onDurationTimer and/or the inactivity timer drx-Inactivity Timer starts and before the timer drx-onDurationTimer and/or the inactivity timer drx-Inactivity Timer expires).

According to an embodiment, when a DRX cycle is configured, the active time includes the time while:

timer drx-onDurationTimer or drx-Inactivity Timer configured for the DRX group is running; or timer drx-RetransmissionTimerDL or drx-RetransmissionTimerUL is running on any Serving Cell in the DRX group; or timer ra-ContentionResolutionTimer or msgB-Response Window is running; or a scheduling request is sent on physical uplink control channel (PUCCH) and is pending; or a PDCCH indicating a new transmission addressed to the a C-RNTI (cell-radio network temporary identifier) of a MAC (media access control) entity has not been received after successful reception of a random access response for the random access preamble not selected by the MAC entity among the contention-based random access preamble.

In NR (New Radio), more power saving techniques are proposed. For example, a DCI (downlink control information) format 2_6 is used for notifying power saving information outside the DRX active time for one or more UEs; a field in DCI formats 0_1 and 1_1 may be used to indicate the minimum applicable scheduling offset (e.g. cross slot scheduling), DCI format 0_1 or 1_1 or 2_6 may be used to indicate a SCell (secondary cell) dormancy, etc.

In 5G new radio unlicensed (NR-U), the search space set group switching functionality is specified to be supported by the UE. The search space set group switching may be triggered by the DCI format 2-0 and the timer with the value configured by the high layer parameter (e.g. searchSpaceSwitchingTimer-r16). The UE may be provided a group index for a respective search space set by the high layer parameter (e.g. searchSpaceGroupIdList-r16) for PDCCH monitoring on a serving cell. If the UE is provided with the high layer parameter (e.g. searchSpaceSwitchingGroupList-r16), which indicates one or more groups of serving cells, the procedures of search space set group switching are applied to all serving cells within each group. Otherwise, the procedures of search space set group switching are applied only to a serving cell for which the UE is provided the high layer parameter (e.g. searchSpaceGroupIdList-r16).

One power saving technique (function) may be PDCCH skipping. The PDCCH skipping relates to the UE stopping monitoring the PDCCH in at least one search space set for a certain time duration. After this time duration, the UE continues monitoring the PDCCH according to a configuration of the search space set(s).

In addition, cross slot scheduling may also be adopted for reducing power consumption. The cross slot scheduling describes a high layer signaling minimumSchedulingOffsetK0 which may configure one or two minimum value(s) of K0 (i.e. K0min). If the high layer signaling minimumSchedulingOffsetK0 is configured, a bitwidth of a minimum applicable scheduling offset indicator field in DCI format 1_1 is 1 bit. Otherwise, the bitwidth of the minimum applicable scheduling offset indicator field in DCI format 1_1 is 0 bit. In addition, a high layer signaling minimumSchedulingOffsetK2 may configure one or two minimum applicable values of K2 (i.e. K2min). If the high layer signaling minimumSchedulingOffsetK2 is configured, a bitwidth of a minimum applicable scheduling offset indicator field in DCI format 0_1 is 1 bit. Otherwise, the bitwidth minimum applicable scheduling offset indicator field in DCI format 0_1 is 0 bit. The minimum applicable scheduling offset indicator field in DCI format 0_1 or DCI format 1_1 is used to determine (or indicate) the minimum applicable value of K0 (i.e k0min) or the minimum applicable value of K2 (i.e. k2min). Note that, K0 is a slot offset between DCI and its scheduled PDSCH. In addition, K2 is a slot offset between DCI and its scheduled PUSCH. K0min is the minimum slot offset between DCI and its scheduled PDSCH (physical downlink shared channel). K2min is the minimum slot offset between DCI and its scheduled PUSCH (physical uplink shared channel). If K0min is greater than 0, a scheduled PDSCH scheduled by DCI and this DCI is not received in one slot and the UE may have relaxing processing time to save power. Similarly, if K2min is greater than 0, a scheduled PUSCH scheduled by DCI and this DCI is not in one slot and the UE may have relaxing processing time to save power.

For each downlink (DL) bandwidth part (BWP) configured to a UE in a serving cell, the UE is provided by higher layers with S search space sets (S≤10), wherein the UE is provided with the following (radio resource control (RRC)) parameters via a higher layer signaling SearchSpace for each search space set from the S search space sets:

a search space set index s, 0<s<40, denoted (e.g. indicated) by parameter searchSpaceId;

an association between the search space set s and a CORESET (Control resource set) p;

a physical downlink control channel (PDCCH) monitoring periodicity of $k_s$ slots and a PDCCH monitoring offset of $o_s$ slots;

a PDCCH monitoring pattern within a slot, indicating first symbol(s) of the CORESET within a slot for PDCCH monitoring;

a duration of $T_s < k_s$ slots indicating a number of slots that the search space set s exists;

a number of PDCCH candidates $$M_s^{(L)}$$

per control channel element (CCE) aggregation level L; and an indication that search space set s is either a common search space (CSS) set or a UE-specific search space (USS) set indicated by parameter searchSpaceType.

In an embodiment, a PDCCH candidate with index $m_{s,n_{CI}}$ for a search space set $S_j$ using a set of CCEs in a CORESET p on the active DL BWP for serving cell $n_{CI}$ is not counted as a PDCCH candidate to be monitored if there is a PDCCH candidate with index $m_{s,n_{CI}}$ for a search space set $S_i$ (where $S_i < S_j$) (i.e. index i<index j), or if there is a PDCCH candidate with index $n_{s,n_{CI}}$ and $n_{s,n_{CI}} < m_{s,n_{CI}}$, in the CORESET p on the active DL BWP for serving cell $n_{CI}$ using the same set of CCEs, the PDCCH candidates have identical scrambling, and the corresponding DCI formats for the PDCCH candidates have the same size. Otherwise, the PDCCH candidate with index $m_{s,n_{CI}}$ $m_{s,n_{CI}}$ is counted as a PDCCH candidate to be monitored.

In an embodiment, the CCEs for PDCCH candidates are non-overlapped if they correspond to:

different CORESET indexes, or different first symbols for the reception of the respective (e.g. separate) PDCCH candidates.

In an embodiment, The UE is not required to monitor, on the active DL BWP of the scheduling cell, more than min{Mmaxμ,Mtotalμ} (i.e. the minimum value between two variables Mmaxμ and Mtotalμ) PDCCH candidates or more than min{Cmaxμ,Ctotalμ} (i.e. the minimum value between two variables Cmaxμ,Ctotalμ) non-overlapped CCEs per time unit for each scheduled cell, wherein μ is subcarrier spacing (SCS) of the active DL BWP of the scheduling cell which schedules the scheduled cell, μ ∈ {0,1,2,3}. In some embodiments, time unit is one or more slots or one or more spans or one or more symbols. For example, time unit is one slot or one span.

That is, the UE may not monitor in some search space set if the number of PDCCH candidate is greater than min{Mmaxμ,Mtotalμ} or the number of non-overlapped CCEs is greater than min{Cmaxμ,Ctotalμ} per slot or per span for each scheduled cell.

Note that, Mmaxμ is the maximum number of monitored PDCCH candidates per slot (or per span or more than one slot or more than one span or one or more symbols) for a DL BWP with SCS configuration μ for a single serving cell. In some embodiments, μ ∈ {0,1,2,3}.

Cmaxμ is the maximum number of non-overlapped CCEs per slot (or per span or more than one slot or more than one span or one or more symbols) for a DL BWP with SCS configuration μ for a single serving cell.

Mtotalμ is the maximum total number of monitored PDCCH candidates per time unit (i.e per slot) for DL BWP(s) with SCS configuration μ for serving cell(s) when the number of downlink serving cells UE configured is greater than the configured capability of number of cells for PDCCH blind detection.

In some embodiments, Mtotalμ is determined to be associated with at least one of the following: SCS of the scheduled cell, number of cells for PDCCH blind detection, configured downlink cells, Mmaxμ(μ ∈ {0,1,2,3}).

Cmaxμ is the maximum total number of non-overlapped CCEs per time unit (i.e per slot) for DL BWP(s) with SCS configuration μ for serving cell(s) when the number of downlink serving cells UE configured is greater than the configured capability of number of cells for PDCCH blind detection.

In some embodiments, Cmaxμ is determined to be associated with at least one of the following: SCS of the scheduled cell, number of cells for PDCCH blind detection, configured downlink cells, Cmaxμ(μ ∈ {0,1,2,3}).

In an embodiment, a method of allocating PDCCH candidates to be monitored according to the present disclosure is described in the following.

In search space sets within a slot n or within a span in slot n, the CSS (common search space) sets with cardinality of $I_{CSS}$ are denoted by $S_{CSS}$ and the USS (user-specific search space) sets with cardinality of $J_{USS}$ are represented by $S_{USS}$. The location of a USS set $S_j$, $0 \le j < J_{uss}$, in $S_{USS}$ is according to an ascending order of the search space set index.

In an embodiment, $$M_{S_{CSS(i)}}^{(L)},$$

($0 \le i \le I_{CSS}$) denotes the number of counted PDCCH candidates to be monitored in CSS set $S_{CSS}(i)$ and and $$M_{S_{USS(j)}}^{(L)},$$

($0 \le j \le J_{USS}$) denotes the number of counted PDCCH candidates to be monitored in the USS set $S_{USS}(j)$.

For the CSS sets, a UE monitors $$M_{PDCCH}^{CSS} = \sum_{i=0}^{I_{CSS}-1} \sum_{L} M_{S_{CSS}(i)}^{(L)}$$

PDCCH candidates requiring a total of $$C_{PDCCH}^{CSS}$$

non-overlapping CCEs in a slot or in a span.

In an embodiment, the UE allocates PDCCH candidates to be monitored to the USS sets for the primary cell having an active DL BWP with SCS configuration μ in a slot if the UE is not provided with a parameter PDCCHMonitoringCapabilityConfig for the primary cell or if the UE is provided with the parameter PDCCHMonitoringCapability Config=r15monitoringcapability for the primary cell, or in the first span of each slot if the UE is provided with the parameter PDCCHMonitoringCapabilityConfig= r16monitoringcapability for the primary cell, according to the following pseudocode. If, for the USS sets for scheduling on the primary cell, the UE is not provided with a parameter CORESETPoolIndex for first CORESETs, or is provided with the parameter CORESETPoolIndex with a value "0" for first CORESETs, and is provided the parameter CORESETPoolIndex with a value "1" for second CORESETs, and if min(γ·Mmaxμ, Mtotalμ)>min(Mmaxμμ, Mtotalμ) or min (γ·Cmaxμ, Ctotalμ)>min(Cmaxμμ, Ctotalμ), the following pseudocode applies only to USS sets associated with the first CORESETs. A UE is not expected to monitor PDCCH in a USS set without allocated PDCCH candidates for monitoring. In the following pseudocode, if the UE is provided parameter PDCCHMonitoringCapabilityConfig=r 16monitoringcapability for the primary cell, Mmaxμ is the maximum number of monitored PDCCH candidates per span for a DL BWP with SCS configuration μ ∈ {0,1,2,3} for a single serving cell and Cmaxμ is the maximum number of non-overlapped CCEs per span for a DL BWP with SCS configuration μ ∈ {0,1,2,3} for a single serving cell. Mtotalμ and Ctotalμ are also determined per span.

In an embodiment, $V_{CCE}(S_{USS}(j))$ denotes the set of non-overlapping CCEs for search space set $S_{USS}(j)$ and C $(V_{CCE}(S_{USS}(j)))$ denotes the cardinality of $V_{CCE}(S_{USS}(j))$ where the non-overlapping CCEs for search space set $S_{USS}(j)$ are determined based on the allocated PDCCH candidates to be monitored in the CSS sets and the allocated PDCCH candidates to be monitored in all search space sets $S_{USS}(k)$ $(0≤k≤j)$.

Pseudocode:
Set $M_{PDCCH}^{USS} = \min(Mmaxμ, Mtotalμ) - M_{PDCCH}^{CSS}$
Set $C_{PDCCH}^{USS} = \min(Cmaxμ, Ctotalμ) - C_{PDCCH}^{CSS}$
Set $j = 0$
while $\sum_L M_{S_{USS}(j)}^{(L)} \leq M_{PDCCH}^{USS}$ AND $C(V_{CCE}(S_{USS}(j))) < C_{PDCCH}^{USS}$ allocate $\sum_L M_{S_{USS}(j)}^{(L)}$ PDCCH candidates to be monitored to USS set $S_{USS}(j)$ $M_{PDCCH}^{USS} = M_{PDCCH}^{USS} - \sum_L M_{S_{USS}(j)}^{(L)}$;
$C_{PDCCH}^{USS} = C_{PDCCH}^{USS} - C(V_{CCE}(S_{USS}(j)))$;
$j = j + 1$;
end while In an embodiment, when the number of counted PDCCH candidate to be monitored is more than min{Mmaxμ, Mtotalμ} or the number of non-overlapped CCEs is more than min{Cmaxμ, Ctotalμ} per slot for each scheduled cell, some search space sets may not be monitored. The pseudocode above shows a method to determine which search space set should be monitored. According to the pseudocode, CSS set must be monitored. The PDCCH candidates in USS sets may be allocated in a sequence from lower index to higher index. Therefore, some USS sets with higher indexes may not be monitored. However, if a PDCCH skipping and/or a search space set group switching and/or a search space set reduction method is used, the UE may not monitor PDCCH candidates in one or more search space sets. Reusing the above method of counting the number of the PDCCH candidate to be monitored and the above method to determine which search space set shall be monitored may cause performance loss because the UE may still count and allocate the PDCCH candidate in the search space set which does not need to be monitored. In addition, if the number of PDCCH candidates is more than min{Mmaxμ, Mtotalμ}, some useful search space sets (e.g. the search space sets needed to be monitored) may not be monitored and may influence the performance. In some embodiments, the search space set reduction method is a method of reducing the number of search space sets which are needed to be monitored.

Therefore, the present disclosure provides a method to reduce useless PDCCH candidate counting or useless monitoring in the following embodiments.

In an embodiment, the UE may receive a high layer signaling. The high layer signaling may include at least search space set configuration information.

In this embodiment, the UE may determine PDCCH candidates to be monitored for search space sets according to the at least one of the high layer signaling and predefined information.

Next, the UE may monitor the determined PDCCH candidates.

In some embodiments, determining PDCCH candidates to be monitored for search space sets includes at least one of the following:

counting the (number of) PDCCH candidates to be monitored in each search space set;

allocating the PDCCH candidates to be monitored for the search space sets, e.g., based on at least a first parameter. Note that, the number of allocated PDCCH candidates may not be more than the capability of the maximum number of monitored PDCCH candidates. In addition, the corresponding number of non-overlapped CCEs may not be more than the capability of the maximum number of non-overlapped CCEs. In another words, PDCCH candidates are allocated until either or both limit(s) of (the number of PDCCH candidates, the number of CCEs) is/are met. If all PDCCH candidates in a search space set cannot be allocated, any candidate in this search space set and in any subsequent search space set are dropped (i.e. not allocated).

In this embodiment, the method of counting the number of PDCCH candidates or the number of non-overlapped CCEs to be monitored in each search space set is according to at least one of the high layer signaling and the predefined information.

In some embodiments, the predefined information includes at least one of the following: a PDCCH skipping indication, a search space set group switch indication, a DCI, a PDCCH reduction indication, search space set, frequency range(FR) type, SCS, K0min, K2min, DRX inactivity timer, DRX on duration timer, DRX state, DRX configuration, CORESET, BWP, K0, K2, Radio Network Temporary Identifier (RNTI), high layer signaling, serving cell configuration.

In some embodiments, the PDCCH skipping indication is used to indicate parameter(s) of PDCCH skipping. In some embodiments, the search space set group switch indication is used to indicate parameter(s) of search space set group switch. In some embodiments, the PDCCH reduction indication is used to indicate parameter(s) of PDCCH reduction method.

In some embodiments, the method of counting the number of PDCCH candidates to be monitored in each search space set is according to (or based on) at least high layer signaling and this search space set. For example, if a search space set is an active search space set, the number of PDCCH candidates to be monitored in this search space set is counted based on the high layer signaling. If the search space set is an inactive search space set, the number of PDCCH candidates to be monitored in this search space set is fixed (e.g. defined, set) to zero. In an embodiment, the high layer signaling includes at least search space set configuration information.

Particularly, the method of counting the number of PDCCH candidates to be monitored for each of search space sets comprises at least one of the following: a method of counting the number of PDCCH candidates that is not applied for inactive search space sets; defining the number of PDCCH candidates to be monitored in inactive search space set to X (counted number is X), X is an integer greater than or equal to zero. In some embodiments X=0. In some embodiments, X is associated with (e.g. determined based on) subcarrier spacing (SCS).

In some embodiments, the PDCCH candidates in the inactive search space sets may not be counted when the UE counts the number of PDCCH candidates to be monitored for each of the search space sets.

In some embodiments, the method of counting the number of PDCCH candidates to be monitored comprises the above described method.

In some embodiments, the method of counting the number of PDCCH candidates to be monitored comprises the above described method according to at least one of high layer signaling and predefined information.

In some embodiments, the method of counting the number of PDCCH candidates to be monitored comprises not counting the number of PDCCH candidates in inactive search space sets, if at least one of the predefined information is received:

a PDCCH skipping indication, a search space set group switch indication, a PDCCH reduction indication.

In some embodiments, the method of counting the number of PDCCH candidates to be monitored comprises defining (e.g. setting) the number of PDCCH candidates to be monitored in an inactive search space set to be zero (counted number is zero), if at least one of the predefined information is received: a PDCCH skipping indication, a search space set group switch indication, a PDCCH reduction indication.

In some embodiments, the method of counting the number of PDCCH candidates to be monitored comprise counting the number of PDCCH candidates that are not applied for inactive search space sets, if at least one of the following predefined information is received: a PDCCH skipping indication, a search space set group switch indication, a PDCCH reduction indication.

In some embodiments, the predefined information includes at least one search space set. For example, if the search space set is an inactive search space set, the method of counting the number of PDCCH candidates to be monitored comprise the above described method.

In some embodiments, the predefined information includes at least a DRX state (e.g. DRX on state or DRX off state). For example, if the UE is in a DRX off state, the method of counting the number of PDCCH candidates to be monitored comprises the above described method.

In some embodiments, the predefined information includes CORESET. For example, PDCCH candidates in a search space set in a first type of CORESET are counted or allocated, and PDCCH candidates in a search space set in a second type of CORESET are defined such that the corresponding counted number is zero or are not allocated. In some embodiments, the first type of CORESET comprises at least CORESET#0. In some embodiments, the second type of CORESET comprises any one except CORESET#0.

In some embodiments, the predefined information includes the SCS. For example, the above method of counting the number of PDCCH candidates to be monitored in each search space set is not applied for a first kind of SCS. In another example, the above method of counting the number of PDCCH candidates to be monitored in each search space set is not applied for a second kind of SCS. In some embodiments, the first kind of SCS includes at least $\mu=0,1$. In some embodiments, the second kind SCS includes at least $\mu=3$.

In some embodiments, the predefined information includes an RNTI. For example, a search space set or a PDCCH candidate associated with a first kind of RNTI are counted or allocated. In another example, a search space set associated or a PDCCH candidate with a second kind of RNTI are counted to be zero or not allocated. In some embodiments, the first kind of RNTI includes at least one of paging RNTI (P-RNTI), random access-RNTI (RA-RNTI), or system information RNTI (SI-RNTI). In some embodiments, the second kind of RNTI includes at least one of cell radio network temporary identifier (C-RNTI), configured scheduling RNTI (CS-RNTI), or modulation coding scheme (MCS-RNTI).

In some embodiments, the predefined information includes at least a DRX on duration timer and a DRX inactivity timer. For example, if both the DRX on duration timer and the DRX inactivity timer are not running, the method of counting the number of PDCCH candidates to be monitored comprises the above described method.

In some embodiment, the predefined information includes at least a search space set. In these embodiments, the counting the number of PDCCH candidates to be monitored corresponding to each of the plurality of search space sets and/or non-overlapped CCEs of at least one PDCCH candidate corresponding to each of the plurality of search space sets based on the predefined control information includes:

a first PDCCH candidate in a first search space set with a first index is ignored when counting the number of the at least one PDCCH candidate when:

a second PDCCH candidate in a second search space set having a second index uses the same set of CCEs as the first PDCCH candidate, wherein the first index is greater than the second index, the second PDCCH candidate in the second search space set has the same scrambling as the first PDCCH candidate, and DCI format corresponding to the second PDCCH candidate in the second search space set has the same size as DCI format corresponding to the first PDCCH candidate Note that, the first search space set and the second search space set are active search space sets.

In some embodiments, the predefined information includes at least a search space set. In these embodiments, the method of counting the number of PDCCH candidates to be monitored in search space sets includes:

a PDCCH candidate with index $m_{s,n_{CI}}$ for an active search space set $S_j$ using a set of CCEs in a CORESET p on the active DL BWP for serving cell $n_{CI}$ is not counted to be monitored if there is a PDCCH candidate with index $m_{s,n_{CI}}$ for an active search space set $S_i$ (where $S_i<S_j$ (i.e. index i<index j)), in the CORESET p on the active DL BWP for serving cell $n_{CI}$ using the same set of CCEs, the PDCCH candidates have identical scrambling, and the corresponding DCI formats for the PDCCH candidates have the same size.

In some embodiments, a PDCCH candidate in any search space set configured on an active DL BWP for each scheduled cell is counted as the PDCCH candidate to be monitored other than the cases shown above. In an embodiment, CI is (e.g. denotes or represents) an index of the serving cell.

In another embodiment, the method of counting PDCCH candidates for monitoring search space sets includes: a PDCCH candidate with index $m_{s,n_{CI}}$ for an active search space set $S_j$ using a set of CCEs in a CORESET p on the active DL BWP for serving cell $n_{CI}$ is counted to be monitored if there is a PDCCH candidate with index $m_{s,n_{CI}}$ for an inactive search space set $S_i$ (where $S_i<S_j$ (i.e. index i<index j)), in the CORESET p on the active DL BWP for serving cell $n_{CI}$ using the same set of CCEs, the PDCCH candidates have identical scrambling, and the corresponding DCI formats for the PDCCH candidates have the same size.

In another example, the method of counting PDCCH candidates to be monitored in inactive search space set comprises fixing the counted number for the inactive search space set to zero.

In some embodiments, the predefined information includes at least search space set. In some embodiments, the method of counting the number of PDCCH candidates to be monitored in search space sets includes: a PDCCH candidate with index $m_{s,n_{CI}}$ corresponding to an active search space set $S_j$ using a set of CCEs in a CORESET p on the active DL BWP for serving cell $n_{CI}$ is not counted as a PDCCH candidate to be monitored if there is a PDCCH candidate with index $n_{s,n_{CI}}$ and $n_{s,n_{CI}}<m_{s,n_{CI}}$ in the CORESET p on the active DL BWP for serving cell $n_{CI}$ using the same set of CCEs, the PDCCH candidates have identical scrambling, and the corresponding DCI formats for the PDCCH candidates have the same size.

In some embodiments, the predefined information includes at least a search space set and the counting method of non-overlapped CCEs for inactive search space set includes that defining the counted number of non-overlapped CCEs to be monitored in inactive search space set to zero.

In some embodiments, the method of counting the number of PDCCH candidates or the number of non-overlapped CCEs to be monitored for each search space set is based on a high layer signaling.

In some embodiments, if at least one of the following high layer signaling is received (configured), the method of counting the number of PDCCH candidates to be monitored is determined based on the higher layer signaling:

a higher layer signaling configured to support a PDCCH monitoring method used in release 17;

a higher layer signaling configured for at least two search space set group for a BWP;

a higher layer signaling configured for a support of search space set group switching;

a higher layer signaling configured for a PDCCH skipping parameter;

a higher layer signaling configured for a K0min or K2min.

In some embodiments, the method of counting the number of PDCCH candidates to be monitored determined based on the higher layer signaling comprises at least one of the following:

defining (e.g.) the number of PDCCH candidates to be monitored for inactive search space set to a predefined value. In some embodiments, predefined value is an integer greater than or equal to zero. For example, the predefined value is zero, which means the counted number is zero;

not counting the number of PDCCH candidates to be monitored for inactive search space sets;

not applying (e.g. performing) the method of counting the number of PDCCH candidates to be monitored for inactive search space sets.

In some embodiments, the high layer signaling is a MAC control element (CE) signaling or a RRC (radio resource control) signaling.

In some embodiments, UE or gNB determines inactive search space set or active search space set associate with high layer signaling or predefined information.

In some embodiments, if a BWP configured with at least two search space set groups or a BWP or a serving cell supports a search space set group switching, the UE may only monitor one search space set group and/or may not monitor another search space set group. In some embodiments, the UE determines which search space set group is needed to be monitored according to DCI (e.g. search space set group switch indication).

In some embodiments, the UE or BS (e.g. gNB) determines the inactive search space set(s) or active search space set(s) based on predefined information, wherein the predefined information includes the search space set group switch indication.

In some embodiments, Active (or second kind of) search space sets are search space sets which may be monitored based on the search space set group switching indication. For example, the DCI (i.e. search space set group switching indication) indicates an index 1 of search space set group by the search space set group switch indication and the active search space sets are search space sets configured with search space set group index 1 in an active BWP in each scheduled cell. In this example, the inactive (or first kind of) search space sets are search space sets configured with search space set group index 0 in an active BWP in each scheduled cell. That is, the DCI may indicate the inactive search space set via indicating the active search space set, and vice versa.

In some embodiments, the UE or gNB determines inactive search space set or active search space set based on predefined information, wherein the predefined information includes the search space set group switch indication.

In some embodiments, inactive (or first kind of) search space set are search space sets which may not (need to) be monitored based on the search space set group switching indication. For example, an active BWP in a scheduled cell is configured with two groups of search space sets (e.g. a group with a group index 0 and another group with a group index 1) and the DCI indicates the group index 1 via the search space set group switch indication. In such conditions, the UE determines the inactive search space sets are search space sets configured with the group index 0 in an active BWP in each scheduled cell.

In some embodiments, the UE or gNB determines inactive search space set(s) or active search space set(s) based on predefined information, wherein the predefined information includes the PDCCH skipping indication.

In some embodiments, if a PDCCH skipping is triggered for a BWP or serving cell or the UE receives a PDCCH skipping indication, the UE may not monitor PDCCH in some search space set of the BWP or serving cell. Search space sets which may be monitored are active search space sets. Search space sets which may not (need to) be monitored because of PDCCH skipping are inactive search space sets. For example, if a PDCCH skipping is triggered by a PDCCH skipping indication, the UE may not monitor USS during a certain time duration. In this example, the inactive search space sets are USS sets of the serving cell and/or the active search space sets are CSS sets of the serving cell.

In some embodiments, search space sets which may be monitored are active search space sets.

In some embodiments, search space sets which may not (need to) be monitored are inactive search space sets.

In some embodiments, the UE or gNB determines inactive search space set(s) or active search space set(s) based on a high layer signaling and/or predefined information. For example, inactive search space sets are search space sets with different group indexes corresponding to the indicated search space set group index.

In some embodiments, the UE or gNB determines inactive search space set(s) or active search space set(s) based on BWP or serving cell.

In some embodiments, inactive search space sets are search space sets in deactivated BWP or deactivated serving cell.

In some embodiments, PDCCH reduction method is a method of reducing the number of search space sets or PDCCHs (e.g. PDCCH candidates) to save UE power.

In an embodiment, the UE receives a high layer signaling, which includes at least a search space set configuration information, and determines PDCCH candidates for monitoring search space sets according to at least one of the high layer signaling and predefined information and monitors the determined PDCCH candidates.

In an embodiment, determining the PDCCH candidates for monitoring search space sets may include at least one of the following:

counting the number of PDCCH candidates to be monitored in each search space set;

allocating PDCCH candidates for monitoring search space sets based on at least a first parameter for the scheduled cell.

In this embodiment, the UE allocates PDCCH candidates for monitoring search space sets for a serving cell having an active DL BWP with SCS configuration μ in a first time duration according to at least one of high layer signaling and predefined information.

In some embodiments, the serving cell is a primary cell or a special cell or a secondary primary cell. In some embodiments, the serving cell is a secondary cell.

In some embodiments, the first time duration is a slot or a span or several slots or several span or one or more symbols.

In some embodiments, the predefined information includes at least one of the following: a PDCCH skipping indication, a search space set group switch indication, a DCI, a PDCCH reduction indication, search space set, a FR type, a SCS.

In some embodiments, the predefined information includes at least a search space set group switch indication. For example, if the UE receives a search space set group switch indication, the allocating PDCCH candidates for monitoring search space sets includes (or comprises) that inactive search space sets are not applied to the allocated PDCCH candidate procedure.

In some embodiments, the predefined information includes at least a PDCCH skipping indication or a PDCCH reduction indication. For example, if the UE receives the PDCCH skipping indication or the PDCCH reduction indication, allocating PDCCH candidates for monitoring search space sets includes that inactive search space sets are not applied to the procedure of allocating the PDCCH candidate.

In some embodiments, the predefined information includes at least a DCI. For example, if a search space set is not associated with a first DCI format, allocating PDCCH candidates for monitoring search space sets includes that the search space sets associated with the first DCI format are not applied to the procedure of allocating the PDCCH candidate. In some embodiments, the first DCI format may include at least one of the following: DCI format 0-0, DCI format 0-1, DCI format 0-2, DCI format 1-0, DCI format 1-1, DCI format 1-2, DCI format 2-0, or DCI format 2-6.

In some embodiments, the predefined information includes at least a search space set. For example, if the search space set is a Type 3 CSS set or a USS set, allocating PDCCH candidates for monitoring search space sets includes that inactive search space sets are not applied to the procedure of allocating the PDCCH candidate.

In some embodiments, the predefined information includes at least DRX state. For example, if the UE is in the DRX off state, allocating PDCCH candidates for monitoring search space sets includes that inactive search space sets are not applied to the procedure of allocating the PDCCH candidate.

In some embodiments, allocating PDCCH candidates for monitoring search space sets includes that inactive search space sets are not applied to the procedure of allocating the PDCCH candidate, if at least one of the higher layer signaling is received (configured):

a higher layer signaling configured for supporting a PDCCH monitoring method used in release 17;

a higher layer signaling configured for at least two search space set group for a BWP;

a higher layer signaling configured for a support of search space set group switching;

a higher layer signaling configured for a PDCCH skipping parameter;

a higher layer signaling configured for a K0min or K2min.

In some embodiments, inactive search space sets are not applied to the procedure of allocating the PDCCH candidate means that the method of allocating PDCCH candidates does not allocate PDCCH candidates for inactive search space sets. In other words, the UE is not expected to monitor PDCCH in inactive search space sets because the inactive search space sets do not have allocated PDCCH candidates for monitoring. In other words, the method of allocating PDCCH candidates is only applied to active search space sets (e.g. active USS sets).

In some embodiment, active CSS sets are CSS sets in active search space sets. Similarly, active USS sets are USS sets in active search space sets. Inactive CSS sets are CSS sets in inactive search space sets. Inactive USS sets are USS sets in inactive search space sets.

In some embodiments, the UE does not allocate the at least one PDCCH candidate in the inactive search space sets to be monitored by performing at least one of the following operations:

allocating PDCCH candidates in each of CSS sets to be monitored, allocating PDCCH candidates in CSS sets except those corresponding to the inactive search space sets to be monitored, allocating PDCCH candidates in USS sets except those corresponding to the inactive search space sets to be monitored in a sequence of an ascending order of the indexes of the USS sets.

In some embodiments, inactive search space sets being not applied to the procedure of allocating PDCCH candidate includes at least one of the following steps:

(1) allocating PDCCH candidates in active CSS sets to be monitored.

In some embodiments, allocating PDCCH candidates to be monitored for active CSS sets means all PDCCH candidates in active CSS sets are allocated to be monitored and PDCCH candidates in inactive CSS sets are not allocated to be monitored.

In some embodiments, remaining capabilities for allocating PDCCH candidates (e.g. a parameter Mremain) is determined based on the maximum capability for PDCCH candidates (e.g. a parameter MPDCCH) and the number of PDCCH candidates in the active CSS sets (e.g. a parameter Mcss). In some embodiment, remaining capabilities for non-overlapped CCEs (e.g. a parameter Cremain) is based on the maximum capability for non-overlapped CCEs (e.g. a parameter CPDCCH) and the number of non-overlapped CCEs in the active CSS sets (e.g. a parameter Ccss). In some embodiments, the parameter CPDCCH=min{Cmaxμ, Ctotalμ}. in some embodiments, the parameter MPDCCH=min{Mmaxμ,Mtotalμ}. In some embodiments, the parameter Mremain=MPDCCH–Mcss. In some embodiments, the parameter Cremain=CPDCCH–Ccss.

In some embodiments, the following pseudocode shows allocating PDCCH candidates in active CSS sets to be monitored:

Set Mremain=MPDCCH–Mcss,
Set Cremain=CPDCCH–Ccss.

(2) Allocating PDCCH candidates in Type0/0A/1/2 CSS set to be monitored.

In some embodiments, all PDCCH candidates in Type0/0A/1/2 CSS set (Mcss2) are allocated to be monitored. The remaining capabilities for allocating PDCCH candidates (Mremain) becomes Mremain=MPDCCH–Mcss2. In some embodiments, Cremain=CPDCCH–Ccss2, where Ccss2 is the number of non-overlapped CCEs in the Type0/0A/1/2 CSS set.

(3) Allocating PDCCH candidates in active Type 3 CSS sets to be monitored.

In some embodiments, the PDCCH candidates in active Type 3 CSS sets (Mcss3) is allocated to be monitored. In some embodiments, the PDCCH candidates in inactive Type 3 CSS set may not be allocated to be monitored. The remaining capabilities for allocating PDCCH candidates (Mremain) becomes Mremain=Mremain–Mcss3. Cremain=CPDCCH–Ccss3, where Ccss3 is the number of non-overlapped CCEs in the active Type3 CSS set.

(4) Allocating PDCCH candidates to be monitored to active USS sets in an ascending order of index (i.e. from low index to high index).

In some embodiments, for an active USS set (e.g. uss(i)), if the value of a difference of subtracting the number of PDCCH candidates in the active USS set (e.g. Muss(i)) from the remaining number of PDCCH candidates after one or more steps (e.g. Mremain) is not less than zero (i.e. greater than or equal to zero) and the value of a difference of subtracting the number of non-overlapped CCEs in the active USS set (e.g. Cuss(i)) from Cremain is not less than zero, the PDCCH candidates in this active USS set are allocated to be monitored. Otherwise, the PDCCH candidates in the active USS set are not allocated to be monitored.

In some embodiments, the following pseudocode shows the procedure of allocating of PDCCH candidates for monitoring to active USS sets in the ascending order of index (i.e. from low index to high index):

Set i=0
While i≤the number of USS set configured in the active BWP for a scheduled cell
If Muss(i)≤Mremain AND Cuss(i)≤Cremain AND USS set uss(i) is an active search space set
allocate Muss(i) PDCCH candidates in USS set uss(i) to be monitored $$Mremain=Mremain-Muss(i);$$

$$Cremain=Cremain-Cuss(i);$$

end if $$i=i+1;$$

end while

In some embodiments, the following pseudocode shows the procedure of allocating PDCCH candidates in active USS sets to be monitored in the ascending order of index:

Set i=0
While Muss(i)≤Mremain AND Cuss(i)≤Cremain
If USS set uss(i) is an active search space set
allocate Muss(i) PDCCH candidates in USS set uss(i) to be monitored $$Mremain=Mremain-Muss(i);$$

$$Cremain=Cremain-Cuss(i);$$

end if $$i=i+1;$$

end while

In some embodiments, steps (2) and (3) may be changed by step (1). In some embodiments, a method of allocating PDCCH candidates may include step (1) and step (4). In some embodiments, a method of allocated PDCCH candidates may include step (2) and step (3) and step (4).

According to another embodiment, the UE receives a high layer signaling, wherein the high layer signaling includes at least search space set configuration information, determines PDCCH candidates for monitoring search space sets according to at least one of the high layer signaling and predefined information and monitors the determined PDCCH candidates.

In an embodiment, the determining PDCCH candidates for monitoring search space sets may include at least one of the following:

counting the number of PDCCH candidates to be monitored in each search space set;

allocating PDCCH candidates for monitoring search space sets based on at least a first parameter.

In this embodiment, the value of the first parameter is determined according to at least one of high layer signaling and predefined information.

In some embodiments, the first parameter includes at least one of the following:

the maximum number of monitored PDCCH candidates (Mmaxμ) per time unit (e.g. per span or per slot) for a DL BWP with SCS configuration μ for a single serving cell;

the maximum number of non-overlapped CCEs (Cmaxμ) per time unit (e.g. per span or per slot) for a DL BWP with SCS configuration μ for a single serving cell.

In some embodiments, the predefined information includes at least search space set group switch indication. For example, a second kind of first parameter (e.g. the first parameter of a second value) may be used if the UE receives a search space set group switch indication. Otherwise, a first kind of first parameter (e.g. the first parameter of a first value) may be used.

In some embodiments, the predefined information includes at least a release type. For example, the first kind of first parameter may be used at least in release 15 and the second kind of first parameter may be used at least in release 17.

In some embodiments, the predefined information includes at least a FR type. For example, the first kind of first parameter may be used at least in FR1 and the second kind of first parameter may be used at least in FR2 (wherein FR1 and FR2 are different FR types).

In some embodiments, the predefined information includes at least K0 or K2. For example, the first kind of first parameter may be used if DCI indicates K0 or K2 less than a first threshold and the second kind of first parameter may be used if DCI indicates K0 or K2 greater than or equal to the first threshold. In some embodiments, the first threshold is an integer greater than zero. For example, the first threshold is 1.

In some embodiments, the predefined information includes at least K0min or K2min. For example, the first kind of first parameter may be used if the current applied K0min or K2min is less than a second threshold and the second kind of first parameter may be used if the current applied K0min or K2min is greater than or equal to the second threshold. In some embodiments, the second threshold is an integer greater than zero. For example, the second threshold is 2.

In some embodiments, the second kind of first parameter may be used if at least one of the following higher layer signaling is received (configured):

a higher layer signaling configured for supporting a PDCCH monitoring method used in release 17;

a higher layer signaling configured for at least two search space set group for a BWP;

a higher layer signaling configured for supporting of search space set group switching;

a higher layer signaling configured for a PDCCH skipping parameter.

In some embodiments, the second kind of the maximum number of monitored PDCCH candidates (Mmax$\mu$_2) per slot (or per span or more than one slot or one or more symbols) for a DL BWP with SCS configuration $\mu \in \{0,1,2,3\}$ for a single serving cell is greater than the first kind of the maximum number of monitored PDCCH candidates (Mmax$\mu$_1) per slot (or per span or more than one slot or one or more symbols) for a DL BWP with same SCS configuration for a single serving cell.

In some embodiments, the second kind of the maximum number of non-overlapped CCEs (Cmax$\mu$_2) per slot (or per span or more than one slot or one or more symbols) for a DL BWP with SCS configuration $\mu \in \{0,1,2,3\}$ for a single serving cell is greater than the first kind of the maximum number of non-overlapped CCEs (Cmax$\mu$_1) per slot (or per span or more than one slot or one or more symbols) for a DL BWP with the same SCS configuration for a single serving cell.

In some embodiments, the second kind of the maximum number of non-overlapped CCEs (Cmax$\mu$_2) per slot (or per span or more than one slot) for a DL BWP with SCS configuration $\mu \in \{0,1,2,3\}$ for a single serving cell is determined based on the first kind of the maximum number of non-overlapped CCEs (Cmax$\mu$_1) per slot (or per span or more than one slot) for a DL BWP with the same SCS configuration for a single serving cell. For example, Cmax$\mu$_2=Cmax$\mu$_1+d, wherein, d is a positive number (e.g., 5).

In some embodiments, the second kind of the maximum number of monitored PDCCH candidates (Mmax$\mu$_2) per slot (or per span or more than one slot) for a DL BWP with SCS configuration $\mu \in \{0,1,2,3\}$ for a single serving cell is determined (e.g. generated) based on the first kind of the maximum number of monitored PDCCH candidates (Mmax$\mu$_1) per slot (or per span or more than one slot) for a DL BWP with the same SCS configuration for a single serving cell. For example, Mmax$\mu$_2=Mmax$\mu$_1+d, wherein, d is a positive number (e.g., 5).

In some embodiments, at least one second kind of the maximum number of non-overlapped CCEs per slot (or per span or more than one slot) for a DL BWP with SCS configuration for a single serving cell reuses the first kind of the maximum number of non-overlapped CCEs per slot (or per span or more than one slot) for a DL BWP with another SCS configuration for a single serving cell. For example, the second kind of the maximum number of non-overlapped CCEs per slot (or per span or more than one slot) for a DL BWP with SCS configuration $\mu$=3 is the same as the first kind of the maximum number of non-overlapped CCEs per slot (or per span or more than one slot) for a DL BWP with SCS configuration $\mu$=1.

In some embodiments, at least one second kind of the maximum number of PDCCH candidates per slot (or per span or more than one slot) for a DL BWP with SCS configuration for a single serving cell reuses the first kind of the maximum number of PDCCH candidates per slot (or per span or more than one slot) for a DL BWP with another SCS configuration for a single serving cell. For example, the second kind of the maximum number of PDCCH candidates per slot (or per span or more than one slot) for a DL BWP with SCS configuration $\mu$=3 is the same as the first kind of the maximum number of PDCCH candidates per slot (or per span or more than one slot) for a DL BWP with SCS configuration $\mu$=1.

According to an embodiment of the present disclosure, the following table shows the first kind of the maximum number of monitored PDCCH candidates per slot for a DL BWP with SCS configuration $\mu \in \{0,1,2,3\}$ for a single serving cell:

| $\mu$ | Maximum number of monitored PDCCH candidates per slot and per serving cell |
|---|---|
| 0 | 44 |
| 1 | 36 |
| 2 | 22 |
| 3 | 20 |

According to an embodiment of the present disclosure, the following table shows the first kind of the maximum number of monitored PDCCH candidates in a span for combination (X, Y) for a DL BWP with SCS configuration $\mu \in \{0, 1\}$ for a single serving cell:

| | Maximum number of monitored PDCCH candidates per span for combination (X, Y) and per serving cell | | |
|---|---|---|---|
| μ | (2, 2) | (4, 3) | (7, 3) |
| 0 | 14 | 28 | 44 |
| 1 | 12 | 24 | 36 |

According to an embodiment of the present disclosure, the following table shows the first kind of the maximum number of non-overlapped CCEs per slot for a DL BWP with SCS configuration $\mu \in \{0,1,2,3\}$ for a single serving cell:

| μ | Maximum number of non-overlapped CCEs per slot and per serving cell |
|---|---|
| 0 | 56 |
| 1 | 56 |
| 2 | 48 |
| 3 | 32 |

According to an embodiment of the present disclosure, the following table shows the first kind of the maximum number of non-overlapped CCEs in a span for combination (X, Y) for a DL BWP with SCS configuration $\mu \in \{0,1\}$ for a single serving cell:

| | Maximum number of non-overlapped CCEs per span for combination (X, Y) and per serving cell | | |
|---|---|---|---|
| μ | (2, 2) | (4, 3) | (7, 3) |
| 0 | 18 | 36 | 56 |
| 1 | 18 | 36 | 56 |

According to an embodiment, the UE receives a high layer signaling, wherein the high layer signaling includes at least search space set configuration information, determines PDCCH candidates for monitoring search space sets according to at least one of the high layer signaling and a predefined information and monitors the PDCCH candidates.

In an embodiment, the determining PDCCH candidates for monitoring search space sets may include at least one of the following:

counting the number of PDCCH candidates to be monitored in each search space sets;

allocating PDCCH candidates for monitoring search space sets based on at least a first parameter.

In some embodiments, the UE is not expected to be configured by a high layer signaling including active CSS sets that result in that the corresponding total, or per scheduled cell, number of monitored PDCCH candidates and the number of non-overlapped CCEs per slot or per span exceed the corresponding maximum numbers per slot or per span, respectively.

In some embodiments, the UE is not expected to be configured by a high layer signaling including USS sets in the same search space set group that result in that the number of monitored PDCCH candidates and the number of non-overlapped CCEs per slot or per span that exceed the corresponding maximum numbers per slot or per span, respectively. In other words, the number of monitored PDCCH candidates and the number of non-overlapped CCEs per slot or per span in the USS sets which are in the same search space set group do not exceed the corresponding maximum numbers per slot or per span, respectively.

Figure 2:
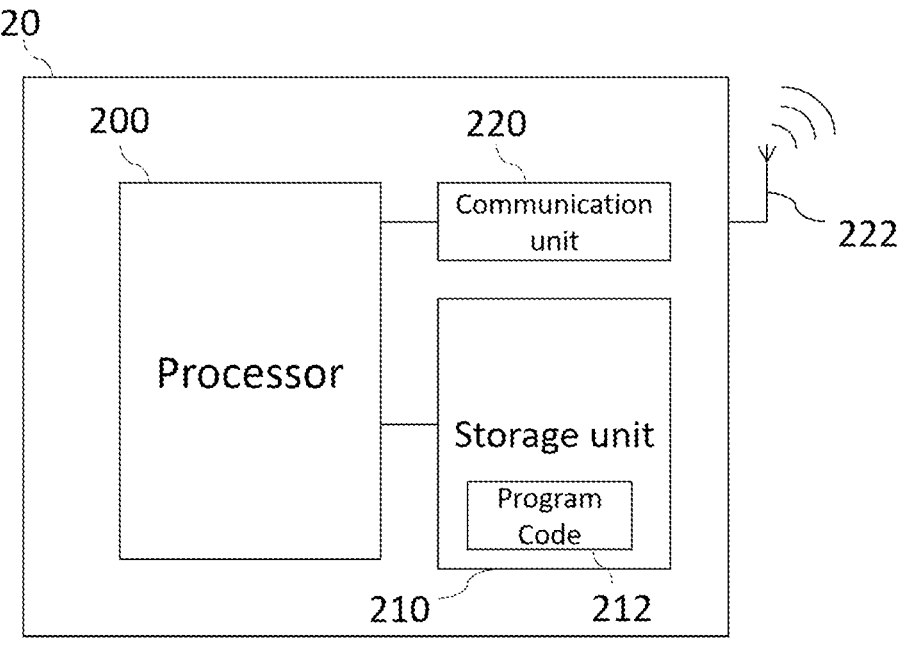
FIG. 2 shows an example of a schematic diagram of a wireless terminal according to an embodiment of the present disclosure.

FIG. 2 relates to a schematic diagram of a wireless terminal 20 in an embodiment of the present disclosure. The wireless terminal 20 may be a communication device, a user equipment (UE), a mobile phone, a laptop, a tablet computer, an electronic book or a portable computer system and is not limited herein. The wireless terminal 20 may include a processor 200 such as a microprocessor or Application Specific Integrated Circuit (ASIC), a storage unit 210 and a communication unit 220. The storage unit 210 may be any data storage device that stores a program code 212, which is accessed and executed by the processor 200. Embodiments of the storage unit 210 include but are not limited to a subscriber identity module (SIM), read-only memory (ROM), flash memory, random-access memory (RAM), hard-disk, and optical data storage device. The communication unit 220 may a transceiver and is used to transmit and receive signals (e.g. messages or packets) according to processing results of the processor 200. In an embodiment, the communication unit 220 transmits and receives the signals via at least one antenna 222 shown in FIG. 2.

In an embodiment, the storage unit 210 and the program code 212 may be omitted and the processor 200 may include a storage unit with stored program code.

The processor 200 may implement any one of the steps in exemplified embodiments on the wireless terminal 20, e.g., by executing the program code 212.

The communication unit 220 may be a transceiver. The communication unit 220 may as an alternative or in addition be combining a transmitting unit and a receiving unit configured to transmit and to receive, respectively, signals to and from a wireless network node (e.g. a base station).

Figure 3:
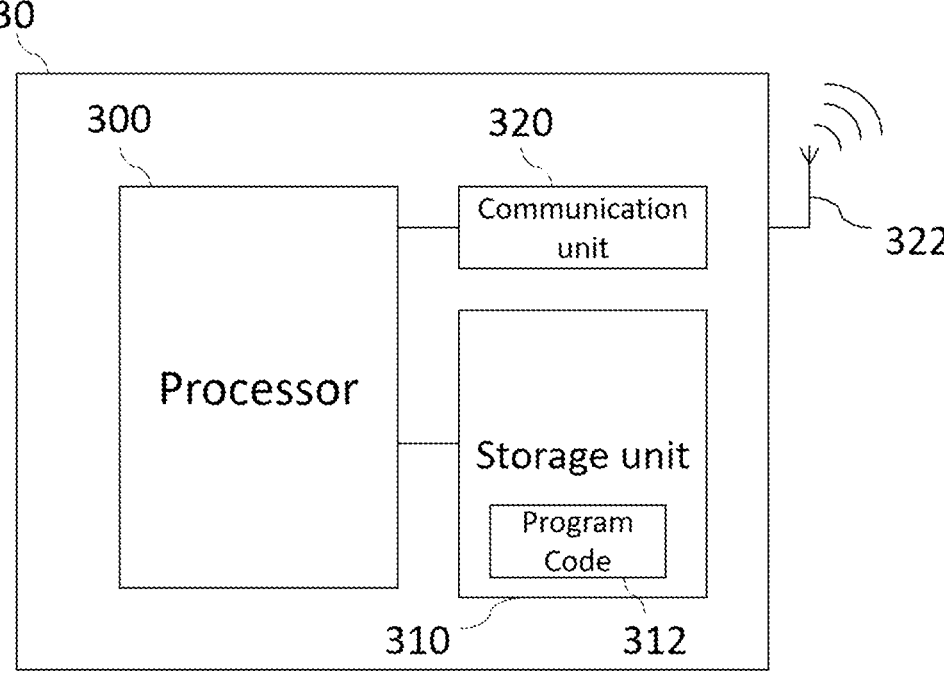
FIG. 3 shows an example of a schematic diagram of a wireless network node according to an embodiment of the present disclosure.

FIG. 3 relates to a schematic diagram of a wireless network node 30 in an embodiment of the present disclosure. The wireless network node 30 may be a communication device, a satellite, a base station (B S), a network entity, a Mobility Management Entity (MME), Serving Gateway (S-GW), Packet Data Network (PDN) Gateway (P-GW), a radio access network (RAN), a next generation RAN (NG-RAN), a data network, a core network or a Radio Network Controller (RNC), and is not limited herein. In addition, the wireless network node 30 may comprise (perform) at least one network function such as an access and mobility management function (AMF), a session management function (SMF), a user plane function (UPF), a policy control function (PCF), an application function (AF), an application protocol client function, an application protocol server function, a port management registration and allocation function, a port allocation function, etc. The wireless network node 30 may include a processor 300 such as a microprocessor or ASIC, a storage unit 310 and a communication unit 320. The storage unit 310 may be any data storage device that stores a program code 312, which is accessed and executed by the processor 300. Examples of the storage unit 310 include but are not limited to a SIM, ROM, flash memory, RAM, hard-disk, and optical data storage device. The communication unit 320 may be a transceiver and is used to transmit and receive signals (e.g. messages or packets) according to processing results of the processor 300. In an example, the communication unit 320 transmits and receives the signals via at least one antenna 322 shown in FIG. 3.

In an embodiment, the storage unit 310 and the program code 312 may be omitted. The processor 300 may include a storage unit with stored program code.

The processor 300 may implement any steps described in exemplified embodiments on the wireless network node 30, e.g., via executing the program code 312.

The communication unit 320 may be a transceiver. The communication unit 320 may as an alternative or in addition be combining a transmitting unit and a receiving unit configured to transmit and to receive, respectively, signals to and from a wireless terminal (e.g. a user equipment).

Figure 4:
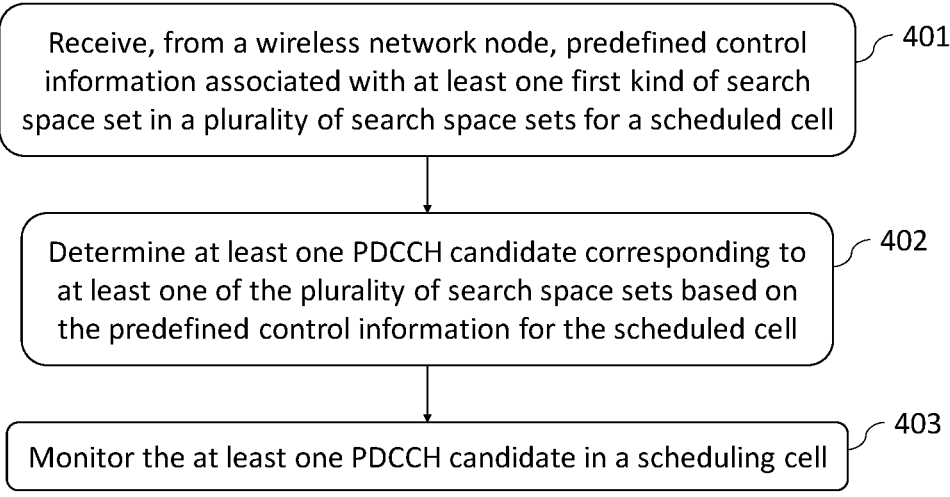
FIG. 4 shows a flowchart of a method according to an embodiment of the present disclosure.

FIG. 4 shows a flowchart of a process according to an embodiment of the present disclosure. The process shown in FIG. 4 may be used in a wireless terminal and comprises the following steps:

Step 401: Receive, from a wireless network node, predefined control information associated with at least one first kind of search space set in a plurality of search space sets for a scheduled cell.

Step 402: Determine at least one PDCCH candidate corresponding to at least one of the plurality of search space sets based on the predefined control information for the scheduled cell.

Step 403: Monitor the at least one PDCCH candidate in a scheduling cell.

More specifically, the wireless terminal receives predefined control information from a wireless network node (e.g. BS) for a scheduled cell, wherein the predefined control information is associated with at least one first kind of search space set (e.g. inactive search space set) in a plurality of search space sets configured for the scheduled cell. In an embodiment, the predefined control information comprises at least one of a higher layer signaling or predefined information. Based on the predefined control information, the wireless terminal determines at least one PDCCH candidate corresponding to at least one of the plurality of search space sets. The wireless terminal monitors the determined PDCCH candidate(s) in a scheduling cell, e.g., to receive DCI scheduling the scheduled cell (e.g. serving cell). In this embodiment, the plurality of search space sets comprises at least one second kind of search space set (e.g. active search space set).

In an embodiment, the first kind of search space set is different from the second kind of search space set.

In an embodiment, the wireless terminal does not (need to) monitor the PDCCH candidate in the at least one first kind of search space set in the scheduling cell based on the predefined control information.

In an embodiment, the wireless terminal (needs to) monitors the PDCCH candidate in the at least one second kind of search space set in the scheduling cell based on the predefined control information.

In an embodiment, the at least one first kind of search space set and the at least one second kind search space set are in an active bandwidth part.

In an embodiment, the predefined control information may explicitly or implicitly indicate (e.g. be associated with) the first kind of search space set. For example, the predefined control information may indicate the second kind of search space set via indicating the first kind of search space set. As an alternative or in addition, the predefined control information may indicate information associated with the first and/or second kind of search space set.

In an embodiment, the predefined control information may comprise at least one of predefined control information comprises at least one of a PDCCH skipping indication, a search space set group switch indication, DCI, a PDCCH reduction indication, a search space set, a frequency range type, a SCS, the minimum applicable value of a scheduling offset between DCI and an uplink channel scheduled by the DCI (i.e. K2min), a value of the scheduling offset between DCI and a downlink channel scheduled by the DCI (i.e. K2), the minimum applicable value of a scheduling offset between DCI and a downlink channel scheduled by the DCI (i.e. K0min), a value of a scheduling offset between DCI and a downlink channel scheduled by the DCI (i.e. K0), a DRX inactivity timer, a DRX on duration timer, a DRX state, a control resource set, a BWP, a RNTI, a higher layer signaling, or a serving cell configuration.

In an embodiment, when determining the at least one PDCCH candidate corresponding to at least one of the plurality of search space sets based on the predefined control information for the scheduled cell, the wireless terminal counts the number of at least one PDCCH candidate corresponding to each of the plurality of search space sets and/or the number of non-overlapped control channel elements, CCEs, of the at least one PDCCH candidate corresponding to each of the plurality of search space sets based on the predefined control information, for determining the at least one PDCCH candidate to be monitored (e.g.

$$\sum_{L} M_{S_{USS(j)}}^{(L)},$$

or ($V_{CCE}(S_{USS}(j))$) or Muss(i) or Mcss or Mcss2 or Mcss3).

In an embodiment, when counting the number of at least one PDCCH candidate corresponding to each of the plurality of search space sets and/or non-overlapped CCEs of at least one PDCCH candidate corresponding to each of the plurality of search space sets based on the predefined control information, the wireless terminal ignores a first PDCCH candidate in a first search space set with a first index when the following conditions are met:

a second PDCCH candidate in a second search space set having a second index uses the same set of CCEs as the first PDCCH candidate, wherein the first index is greater than the second index, the second PDCCH candidate in the second search space set has the same scrambling as the first PDCCH candidate, and DCI format corresponding to the second PDCCH candidate in the second search space set has the same size as DCI format corresponding to the first PDCCH candidate.

In an embodiment, the first search space set and the second search space set are second kind of search space sets.

In an embodiment, when counting the number of the at least one PDCCH candidate corresponding to each of the plurality of search space sets or the non-overlapped CCEs of the at least one PDCCH candidate corresponding to each of the plurality of search space sets based on the predefined control information for the scheduled cell, the wireless terminal performs at least one of following operations:

counting the number of the at least one PDCCH candidate or the non-overlapped control channel elements of the at least one PDCCH candidate corresponding to the plurality of search space sets except the at least one first kind of search space set for the serving cell, excluding (e.g. ignoring) the at least one first kind of search space set when counting the number of the at least one PDCCH candidate and/or the number of the non-overlapped CCEs of the at least one PDCCH candidate corresponding to each of the plurality of search space sets for the serving cell, setting (e.g. defining, fixing) the number of at least one PDCCH candidate corresponding to each of the at least one first kind of search space set and/or the number of non-overlapped control channel elements of the at least one PDCCH candidate corresponding to each of the at least one first kind of search space set as a predefined value, where the predefined value is greater than or equal to 0.

In an embodiment, when determining the at least one PDCCH candidate corresponding to at least one of the plurality of search space sets based on the predefined control information for the scheduled cell, the wireless terminal allocates the at least one PDCCH candidate in at least one of the plurality of search space sets to be monitored in the scheduling cell based on the predefined control information.

In an embodiment, when allocating the at least one PDCCH candidate in at least one of the plurality of search space sets to be monitored in the scheduling cell based on the predefined control information, the wireless terminal performs at least one of the following operations:

allocating the at least one PDCCH candidate in the plurality of search space sets except the at least one first kind of search space set to be monitored in the serving scheduling cell, not allocating the at least one PDCCH candidate in the at least one first kind of search space set to be monitored in the serving scheduling cell.

In an embodiment, the wireless terminal achieves allocating the at least one PDCCH candidate in the plurality of search space sets except the at least one first kind of search space set to be monitored in the serving scheduling cell and/or not allocating the at least one PDCCH candidate in the at least one first kind of search space set to be monitored in the serving scheduling cell by performing at least one of the following operations:

allocating at least one PDCCH candidate in each of CSS set in the plurality of search space sets to be monitored in the scheduling cell, allocating at least one PDCCH candidate in at least one CSS set of the plurality of search space sets except the at least one first kind of search space set to be monitored in the scheduling cell, allocating at least one PDCCH candidate in at least one user-specific search space, USS, set of the plurality of search space sets except the at least one first kind of search space set to be monitored in a sequence of an ascending order of at least one index of the at least one USS set.

In an embodiment, the wireless terminal determines the at least one PDCCH candidate in at least one of the plurality of search space sets to be monitored based on a parameter, whose value is determined based on the predefined control information. In this embodiment, the parameter comprises at least one of the maximum number of monitored PDCCH candidates per time unit or the maximum number of non-overlapped CCEs per time unit. In an embodiment, the time unit may be a slot, a span or more multiple slots.

In an embodiment, the value of the parameter changes between a first value and a second value based on the predefined control information. In an embodiment, the second value is greater than the first value. For example, when the predefined control information (e.g. search space set group switch indication) is received, the value of the parameter may be the second value; otherwise, the value of the parameter is the first value.

Figure 5:
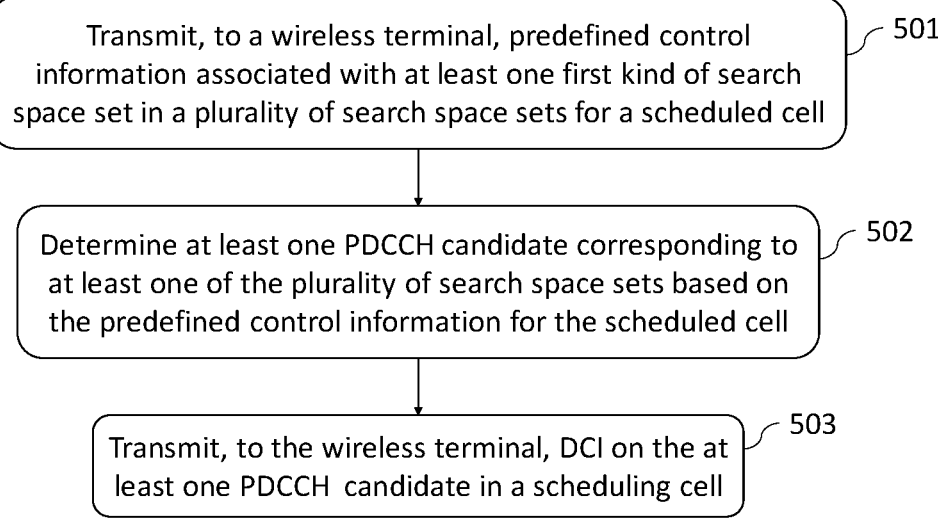
FIG. 5 shows a flowchart of a method according to an embodiment of the present disclosure.

FIG. 5 shows a flowchart of a process according to an embodiment of the present disclosure. The process shown in FIG. 5 may be used in a wireless network node (e.g. BS) and comprises the following steps:

Step 501: Transmit, to a wireless terminal, predefined control information associated with at least one first kind of search space set in a plurality of search space sets for a scheduled cell.

Step 502: Determine at least one PDCCH candidate corresponding to at least one of the plurality of search space sets based on the predefined control information for the scheduled cell Step 503: Transmit, to the wireless terminal, DCI on the at least one PDCCH candidate in a scheduling cell.

In the process shown in FIG. 5, the wireless network node transmits predefined control information to a wireless terminal (e.g. UE) for a scheduled cell, wherein the predefined control information is associated with at least one first kind of search space set (e.g. inactive search space set) in a plurality of search space sets configured for the scheduled cell. Based on the predefined control information, the wireless network node determines at least one PDCCH candidate corresponding to at least one of the plurality of search space sets for the scheduled cell. The wireless network node transmits DCI associated with the scheduled cell in a scheduling cell to the wireless terminal.

In an embodiment, the plurality of search space sets comprises at least one second kind of search space set (e.g. active search space set).

In an embodiment, the first kind of search space set is different from the second kind of search space set.

In an embodiment, the wireless network node does not (need to) transmit DCI on the PDCCH candidate in the at least one first kind of search space set in the scheduling cell based on the predefined control information.

In an embodiment, the wireless network node (needs to) transmit on the PDCCH candidate in the at least one second kind of search space set in the scheduling cell based on the predefined control information.

In an embodiment, the at least one first kind of search space set and the at least one second kind search space set are in an active bandwidth part.

In an embodiment, the predefined control information may explicitly or implicitly indicate (e.g. be associated with) the first kind of search space set. For example, the predefined control information may indicate the second kind of search space set via indicating the first kind of search space set. As an alternative or in addition, the predefined control information may indicate information associated with the first and/or second kind of search space set.

In an embodiment, the predefined control information may comprise at least one of predefined control information comprises at least one of a PDCCH skipping indication, a search space set group switch indication, DCI, a PDCCH reduction indication, a search space set, a frequency range type, a SCS, the minimum applicable value of a scheduling offset between DCI and an uplink channel scheduled by the DCI (i.e. K2min), a value of the scheduling offset between DCI and a downlink channel scheduled by the DCI (i.e. K2), the minimum applicable value of a scheduling offset between DCI and a downlink channel scheduled by the DCI (i.e. K0min), a value of a scheduling offset between DCI and a downlink channel scheduled by the DCI (i.e. K0), a DRX inactivity timer, a DRX on duration timer, a DRX state, a control resource set, a BWP, a RNTI, a higher layer signaling, or a serving cell configuration.

In an embodiment, when determining the at least one PDCCH candidate corresponding to at least one of the plurality of search space sets based on the predefined control information for the scheduled cell, the wireless network node counts the number of at least one PDCCH candidate corresponding to each of the plurality of search space sets and/or the number of non-overlapped control channel elements, CCEs, of the at least one PDCCH candidate corresponding to each of the plurality of search space sets based on the predefined control information, for determining the at least one PDCCH candidate to be monitored (e.g.

$$\sum_{L} M^{(L)}_{S_{USS(j)}},$$

or ($V_{CCE}(S_{USS}(j))$) or Muss(i) or Mcss or Mcss2 or Mcss3).

In an embodiment, when counting the number of at least one PDCCH candidate corresponding to each of the plurality of search space sets and/or non-overlapped CCEs of at least one PDCCH candidate corresponding to each of the plurality of search space sets based on the predefined control information, the wireless network node ignores a first PDCCH candidate in a first search space set with a first index when the following conditions are met:

a second PDCCH candidate in a second search space set having a second index uses the same set of CCEs as the first PDCCH candidate, wherein the first index is greater than the second index, the second PDCCH candidate in the second search space set has the same scrambling as the first PDCCH candidate, and DCI format corresponding to the second PDCCH candidate in the second search space set has the same size as DCI format corresponding to the first PDCCH candidate.

In an embodiment, the first search space set and the second search space set are second kind of search space sets.

In an embodiment, when counting the number of the at least one PDCCH candidate corresponding to each of the plurality of search space sets or the non-overlapped CCEs of the at least one PDCCH candidate corresponding to each of the plurality of search space sets based on the predefined control information for the scheduled cell, the wireless terminal performs at least one of following operations:

counting the number of the at least one PDCCH candidate or the non-overlapped control channel elements of the at least one PDCCH candidate corresponding to the plurality of search space sets except the at least one first kind of search space set for the serving cell, excluding (e.g. ignoring) the at least one first kind of search space set when counting the number of the at least one PDCCH candidate and/or the number of the non-overlapped CCEs of the at least one PDCCH candidate corresponding to each of the plurality of search space sets for the serving cell, setting (e.g. defining, fixing) the number of at least one PDCCH candidate corresponding to each of the at least one first kind of search space set and/or the number of non-overlapped control channel elements of the at least one PDCCH candidate corresponding to each of the at least one first kind of search space set as a predefined value, where the predefined value is greater than or equal to 0.

In an embodiment, when determining the at least one PDCCH candidate corresponding to at least one of the plurality of search space sets based on the predefined control information for the scheduled cell, the wireless network node allocates the at least one PDCCH candidate in at least one of the plurality of search space sets to be monitored in the scheduling cell based on the predefined control information.

In an embodiment, when allocating the at least one PDCCH candidate in at least one of the plurality of search space sets to be monitored in the scheduling cell based on the predefined control information, the wireless network node performs at least one of the following operations:

allocating the at least one PDCCH candidate in the plurality of search space sets except the at least one first kind of search space set to be monitored in the serving scheduling cell, not allocating the at least one PDCCH candidate in the at least one first kind of search space set to be monitored in the serving scheduling cell.

In an embodiment, the wireless network node achieves allocating the at least one PDCCH candidate in the plurality of search space sets except the at least one first kind of search space set to be monitored in the serving scheduling cell and/or not allocating the at least one PDCCH candidate in the at least one first kind of search space set to be monitored in the serving scheduling cell by performing at least one of the following operations:

allocating at least one PDCCH candidate in each of CSS set in the plurality of search space sets to be monitored in the scheduling cell, allocating at least one PDCCH candidate in at least one CSS set of the plurality of search space sets except the at least one first kind of search space set to be monitored in the scheduling cell, allocating at least one PDCCH candidate in at least one user-specific search space, USS, set of the plurality of search space sets except the at least one first kind of search space set to be monitored in a sequence of an ascending order of at least one index of the at least one USS set.

In an embodiment, the wireless network node determines the at least one PDCCH candidate in at least one of the plurality of search space sets to be monitored based on a parameter, whose value is determined based on the predefined control information. In this embodiment, the parameter comprises at least one of the maximum number of monitored PDCCH candidates per time unit or the maximum number of non-overlapped CCEs per time unit. In an embodiment, the time unit may be a slot, a span or more multiple slots.

In an embodiment, the value of the parameter changes between a first value and a second value based on the predefined control information. In an embodiment, the second value is greater than the first value. For example, when the predefined control information (e.g. search space set group switch indication) is received, the value of the parameter may be the second value; otherwise, the value of the parameter is the first value.

FIG. 6 shows a flowchart of a process according to an embodiment of the present disclosure. The process shown in FIG. 6 may be used in a wireless terminal (e.g. UE) and comprises the following steps:

Step 601: Receive, from a wireless network node, a high layer signaling comprising at least one search space set for a scheduled cell.

Step 602: Monitor at least one PDCCH candidate in the at least one search space set in a scheduling cell.

More specifically, the wireless terminal receives a high layer signaling comprising at least one search space set for a scheduled cell from a wireless network node (e.g. BS or gNB) and monitors at least one PDCCH candidate in the at least one search space set in a scheduling cell. In this embodiment, the number of the at least one PDCCH candidate in the at least one search space set configured by the high layer signaling is smaller than or equal to the maximum number of the monitored PDCCH candidates per time unit or the number of non-overlapped control channel elements of the at least one PDCCH candidate in the at least one search space set is smaller than or equal to the maximum number of control channel elements per time unit.

In an embodiment, the time unit is at least one slot or a span.

In an embodiment, the at least one search space set comprises at least one second kind of CSS set (e.g. active CSS set).

In an embodiment, the at least one search space set comprises at least one USS set which has the same search space set group index.

In an embodiment, the value of the parameter changes between a first value and a second value based on the predefined control information. In an embodiment, the second value is greater than the first value. For example, when the predefined control information (e.g. search space set group switch indication) is received, the value of the parameter may be the second value; otherwise, the value of the parameter is the first value.

FIG. 7 shows a flowchart of a process according to an embodiment of the present disclosure. The process shown in FIG. 7 may be used in a wireless network node (e.g. BS or gNB) and comprises the following steps:

Step 701: Transmit, to a wireless terminal, a high layer signaling comprising at least one search space set for a scheduled cell.

Step 702: Transmit, to the wireless terminal, at least one DCI on at least one PDCCH candidate corresponding to the at least one search space set in a scheduling cell.

More specifically, the transmits a high layer signaling comprising (e.g. indicating) at least one search space set for a scheduled cell to a wireless network node (e.g. UE) and transmits DCI on at least one PDCCH candidate in the at least one search space set in a scheduling cell. In this embodiment, the number of the at least one PDCCH candidate in the at least one search space set configured by the high layer signaling is smaller than or equal to the maximum number of the monitored PDCCH candidate per time unit or the number of non-overlapped control channel elements of the at least one PDCCH candidate in the at least one search space set is smaller than or equal to the maximum number of control channel elements per time unit.

In an embodiment, the time unit is at least one slot or a span.

In an embodiment, the at least one search space set comprises at least one second kind of CSS set (e.g. active CSS set).

In an embodiment, the at least one search space set comprises at least one USS set which has the same search space set group index.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A skilled person would further appreciate that any of the various illustrative logical blocks, units, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software unit"), or any combination of these techniques.

To clearly illustrate this interchangeability of hardware, firmware and software, various illustrative components, blocks, units, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, unit, etc. can be configured to perform one or more of the functions described herein. The term "configured to" or "configured for" as used herein with respect to a specified operation or function refers to a processor, device, component, circuit, structure, machine, unit, etc. that is physically constructed, programmed and/or arranged to perform the specified operation or function.

Furthermore, a skilled person would understand that various illustrative logical blocks, units, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, units, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein. If implemented in software, the functions can be stored as one or more instructions or code on a computer-readable medium. Thus, the steps of a method or algorithm disclosed herein can be implemented as software stored on a computer-readable medium.

Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "unit" as used herein, refers to software, firmware, hardware, and any combination of these elements for performing the associated functions described herein. Additionally, for purpose of discussion, the various units are described as discrete units; however, as would be apparent to one of ordinary skill in the art, two or more units may be combined to form a single unit that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A wireless communication method for use in a wireless terminal, the wireless communication method comprising:
receiving, from a wireless network node, predefined control information associated with at least one first kind of search space set in a plurality of search space sets for a scheduled cell,
determining at least one physical downlink control channel (PDCCH) candidate corresponding to at least one of the plurality of search space sets based on the predefined control information for the scheduled cell, and monitoring the at least one PDCCH candidate in a scheduling cell,
wherein the plurality of search space sets comprises at least one second kind of search space set, and wherein the predefined control information comprises at least one of a PDCCH skipping indication or a search space set group switch indication, and
wherein the determining the at least one PDCCH candidate corresponding to at least one of the plurality of search space sets based on the predefined control information for the scheduled cell comprises:
(a) not counting any PDCCH candidates in search space sets of a first kind; and
(b) for search space sets of a second kind:
counting at least one of: a number of at least one PDCCH candidate corresponding to each of the plurality of search space sets of the second kind or a number of non-overlapped control channel elements (CCEs) of the at least one PDCCH candidate corresponding to each of the plurality of search space sets of the second kind based on the predefined control information, for determining the at least one PDCCH candidate to be monitored,
wherein the counting the number of the at least one of: the at least one PDCCH candidate corresponding to each of the plurality of search space sets of the second kind or the non-overlapped CCEs of the at least one PDCCH candidate corresponding to each of the plurality of search space sets of the second kind based on the predefined control information comprises:
a first PDCCH candidate in a first search space set of the second kind with a first index is ignored when counting the number of the at least one PDCCH candidate when:
a second PDCCH candidate in a second search space set of the second kind having a second index uses a same set of CCEs as the first PDCCH candidate, wherein the first index is greater than the second index,
the second PDCCH candidate in the second search space set of the second kind has a same scrambling as the first PDCCH candidate, and
DCI format corresponding to the second PDCCH candidate in the second search space set of the second kind has a same size as DCI format corresponding to the first PDCCH candidate, and
wherein the first kind of search space sets are not monitored by the wireless terminal and the second kind of search space sets are monitored by the wireless terminal; and
wherein the determining the at least one PDCCH candidate corresponding to at least one of the plurality of search space sets based on the predefined control information for the scheduled cell comprises:
determining the at least one PDCCH candidate in at least one of the plurality of search space sets to be monitored based on a parameter, whose value is determined based on the predefined control information,
wherein the parameter comprises at least one of a maximum number of monitored PDCCH candidates per time unit or a maximum number of non-overlapped CCEs per time unit,
wherein the time unit is at least one slot or a span, and
wherein the value of the parameter changes between a first value and a second value based on the predefined control information, and the second value is greater than the first value.

2. The wireless communication method of claim 1, wherein the wireless terminal does not monitor the PDCCH candidate in the at least one first kind of search space set in the scheduling cell based on the predefined control information.

3. The wireless communication method of claim 1, wherein the wireless terminal monitors the PDCCH candidate in the at least one second kind of search space set in the scheduling cell based on the predefined control information.

4. The wireless communication method of claim 1, wherein the at least one first kind of search space set and the at least one second kind of search space set are in an active bandwidth part.

5. The wireless communication method of claim 1, wherein the determining the at least one PDCCH candidate corresponding to at least one of the plurality of search space sets based on the predefined control information for the scheduled cell comprises:

allocating the at least one PDCCH candidate in at least one of the plurality of search space sets to be monitored in the scheduling cell based on the predefined control information, wherein the allocating the at least one PDCCH candidate in at least one of the plurality of search space sets to be monitored in the scheduling cell based on the predefined control information comprises:

allocating the at least one PDCCH candidate in the plurality of search space sets except the at least one first kind of search space set to be monitored in the scheduling cell, or not allocating the at least one PDCCH candidate in the at least one first kind of search space set to be monitored in the scheduling cell, and wherein the allocating the at least one PDCCH candidate in the plurality of search space sets except the at least one first kind of search space set to be monitored in the scheduling cell, or not allocating the at least one PDCCH candidate in the at least one first kind of search space set to be monitored in the scheduling cell comprises at least one of:

allocating at least one PDCCH candidate in each of common search space (CSS) sets in the plurality of search space sets to be monitored in the scheduling cell, allocating at least one PDCCH candidate in at least one CSS set of the plurality of search space sets except the at least one first kind of search space set to be monitored in the scheduling cell, or allocating at least one PDCCH candidate in at least one user-specific search space, USS, set of the plurality of search space sets except the at least one first kind of search space set to be monitored in a sequence of an ascending order of at least one index of the at least one USS set.

6. The wireless communication method of claim 1, wherein the at least one second kind of search space set is associated with a first type of CORESET, and wherein the at least one first kind of search space set is associated with a second type of CORESET.

7. The wireless communication method of claim 1, wherein a determination to apply the PDCCH skipping indication or the search space set group switch indication is based on a discontinuous reception (DRX) state of the wireless terminal.

8. A wireless communication method for use in a wireless network node, the wireless communication method comprising:

transmitting, to a wireless terminal, predefined control information associated with at least one first kind of search space set in a plurality of search space sets for a scheduled cell, determining at least one physical downlink control channel (PDCCH) candidate corresponding to at least one of the plurality of search space sets based on the predefined control information for the scheduled cell, and transmitting, to the wireless terminal, at least one DCI on the at least one PDCCH candidate in a scheduling cell, wherein the plurality of search space sets comprises at least one second kind of search space set, and wherein the predefined control information comprises at least one of a PDCCH skipping indication or a search space set group switch indication, and wherein the determining the at least one PDCCH candidate corresponding to at least one of the plurality of search space sets based on the predefined control information for the scheduled cell comprises:

(a) not counting any PDCCH candidates in search space sets of a first kind; and (b) for search space sets of a second kind:

counting at least one of: a number of at least one PDCCH candidate corresponding to each of the plurality of search space sets of the second kind or a number of non-overlapped control channel elements (CCEs) of the at least one PDCCH candidate corresponding to each of the plurality of search space sets of the second kind based on the predefined control information, for determining the at least one PDCCH candidate to be monitored, wherein the counting the number of the at least one of: the at least one PDCCH candidate corresponding to each of the plurality of search space sets of the second kind or the non-overlapped CCEs of the at least one PDCCH candidate corresponding to each of the plurality of search space sets of the second kind based on the predefined control information comprises:

a first PDCCH candidate in a first search space set of the second kind with a first index is ignored when counting the number of the at least one PDCCH candidate when:

a second PDCCH candidate in a second search space set of the second kind having a second index uses a same set of CCEs as the first PDCCH candidate, wherein the first index is greater than the second index, the second PDCCH candidate in the second search space set of the second kind has a same scrambling as the first PDCCH candidate, DCI format corresponding to the second PDCCH candidate in the second search space set of the second kind has a same size as DCI format corresponding to the first PDCCH candidate, and wherein the first kind of search space sets are not monitored by the wireless terminal and the second kind of search space sets are monitored by the wireless terminal; and wherein the determining the at least one PDCCH candidate corresponding to at least one of the plurality of search space sets based on the predefined control information for the scheduled cell comprises:

determining the at least one PDCCH candidate in at least one of the plurality of search space sets to be monitored based on a parameter, whose value is determined based on the predefined control information, wherein the parameter comprises at least one of a maximum number of monitored PDCCH candidates per time unit or a maximum number of non-overlapped CCEs per time unit, wherein the time unit is at least one slot or a span, and wherein the value of the parameter changes between a first value and a second value based on the predefined control information, and the second value is greater than the first value.

9. The wireless communication method of claim 8, wherein the wireless network node does not transmit the at least one DCI in the at least one first kind of search space set in the scheduling cell.

10. The wireless communication method of claim 8, wherein the wireless network node transmits the at least one DCI in the at least one second kind of search space set in the scheduling cell.

11. The wireless communication method of claim 8, wherein the at least one first kind of search space set and the at least one second kind of search space set are in an active bandwidth part.

12. The wireless communication method of claim 8, wherein the determining the at least one PDCCH candidate corresponding to at least one of the plurality of search space sets based on the predefined control information for the scheduled cell comprises:

allocating the at least one PDCCH candidate in at least one of the plurality of search space sets for transmitting at least one reference signal in the scheduling cell based on the predefined control information, wherein the allocating the at least one PDCCH candidate in at least one of the plurality of search space sets for transmitting the at least one reference signal in the scheduling cell based on the predefined control information comprises:

allocating the at least one PDCCH candidate in the plurality of search space sets except the at least one first kind of search space set for transmitting the at least one reference signal in the scheduling cell, or not allocating the at least one PDCCH candidate in the at least one first kind of search space set for transmitting the at least one reference signal in the scheduling cell, and wherein the allocating the at least one PDCCH candidate in the plurality of search space sets except the at least one first kind of search space set for transmitting the at least one reference signal in the scheduling cell, or not allocating the at least one PDCCH candidate in the at least one first kind of search space for transmitting the at least one reference signal in the scheduling cell comprises at least one of:

allocating at least one PDCCH candidate in each of common search space (CSS) set in the plurality of search space sets for transmitting the at least one reference signal in the scheduling cell, allocating at least one PDCCH candidate in at least one CSS set of the plurality of search space sets except the at least one first kind of search space set for transmitting the at least one reference signal in the scheduling cell, or allocating at least one PDCCH candidate in at least one user-specific search space, USS, set of the plurality of search space sets except the at least one first kind of search space set for transmitting the at least one reference signal in a sequence of an ascending order of at least one index of the at least one USS set.

13. A wireless terminal, comprising:

at least one processor; and a memory, which is configured to store at least one program;

wherein the at least one program, when executed by the at least one processor, enables the at least one processor to perform the method of claim 1.

14. A wireless network node, comprising:

at least one processor; and a memory, which is configured to store at least one program;

wherein the at least one program, when executed by the at least one processor, enables the at least one processor to perform the method of claim 8.

* * * * *